United States Patent
Lee et al.

(10) Patent No.: US 8,204,726 B2
(45) Date of Patent: Jun. 19, 2012

(54) MULTI-SCALE METHOD FOR MULTI-PHASE FLOW IN POROUS MEDIA

(75) Inventors: Seong H. Lee, Berkeley, CA (US); Hui Zhou, Stanford, CA (US); Hamdi A. Tchelepi, Belmont, CA (US)

(73) Assignees: Chevron U.S.A. Inc., San Ramon, CA (US); Schlumberger Technology Corporation, Houston, TX (US)

( * ) Notice: Subject to any disclaimer, the term of this patent is extended or adjusted under 35 U.S.C. 154(b) by 451 days.

(21) Appl. No.: 12/466,171

(22) Filed: May 14, 2009

(65) Prior Publication Data

US 2009/0319242 A1 Dec. 24, 2009

Related U.S. Application Data

(60) Provisional application No. 61/053,980, filed on May 16, 2008.

(51) Int. Cl.
*G06G 7/48* (2006.01)
*G06F 17/10* (2006.01)

(52) U.S. Cl. .................. 703/10; 703/2; 702/12

(58) Field of Classification Search .................. 703/2, 6, 703/9, 10; 702/11–13
See application file for complete search history.

(56) References Cited

U.S. PATENT DOCUMENTS

| | | | |
|---|---|---|---|
| 4,821,164 A | 4/1989 | Swanson | |
| 5,321,612 A | 6/1994 | Stewart | |
| 5,663,928 A | 9/1997 | De Bazelaire et al. | |
| 5,729,451 A | 3/1998 | Gibbs et al. | |
| 5,923,329 A | 7/1999 | Beale | |
| 6,018,497 A | 1/2000 | Gunasekera | |
| 6,078,869 A | 6/2000 | Gunasekera | |
| 6,106,561 A | 8/2000 | Farmer | |
| 6,185,512 B1 | 2/2001 | Lambrecht | |
| 6,266,619 B1 | 7/2001 | Thomas et al. | |
| 6,631,202 B2 | 10/2003 | Hale | |

(Continued)

FOREIGN PATENT DOCUMENTS

WO WO99/52048 10/1999

(Continued)

OTHER PUBLICATIONS

Jenny P. et al., "Adaptively fully implicit multi-scale finite-volume method for muiti-phase flow and transport in rieteroaeneous porous media," Journal of Computational Physics, London, GB LNKD-DOI:10.1016/J.JCP.2006.01.028, vol. 217, No. 2; 20 Sep. 2006, pp. 627-641, XP024947504; ISSN: 0021-9991 [retrieved on Sep. 20, 2006].

(Continued)

*Primary Examiner* — Russell Frejd
(74) *Attorney, Agent, or Firm* — Craig R. Vander Ploeg; Christopher D. Northcutt

(57) ABSTRACT

A multi-scale method to efficiently determine the fine-scale saturation arising from multi-phase flow in a subsurface reservoir is disclosed. The method includes providing a simulation model that includes a fine-scale grid defining a plurality of fine-scale cells, and a coarse-scale grid defining a plurality of coarse-scale cells that are aggregates of the fine-scale cells. The coarse-scale cells are partitioned into saturation regions responsive to velocity and/or saturation changes from the saturation front. A fine-scale saturation is determined for each region and the saturation regions are assembled to obtain a fine-scale saturation distribution. A visual display can be output responsive to the fine-scale saturation distribution.

26 Claims, 20 Drawing Sheets

U.S. PATENT DOCUMENTS

| | | | |
|---|---|---|---|
| 6,662,109 | B2 | 12/2003 | Roggero et al. |
| 6,721,694 | B1 | 4/2004 | Lambrecht et al. |
| 6,766,255 | B2 | 7/2004 | Stone |
| 6,823,297 | B2 | 11/2004 | Jenny et al. |
| 6,826,520 | B1 | 11/2004 | Khan et al. |
| 7,480,206 | B2 | 1/2009 | Hill |
| 7,496,488 | B2 * | 2/2009 | Jenny et al. ............... 703/10 |
| 7,765,091 | B2 | 7/2010 | Lee et al. |
| 2002/0013687 | A1 | 1/2002 | Ortoleva |
| 2005/0177354 | A1 | 8/2005 | Jenny et al. |
| 2005/0273303 | A1 | 12/2005 | Flandrin et al. |
| 2006/0277012 | A1 | 12/2006 | Ricard et al. |

FOREIGN PATENT DOCUMENTS

| | | |
|---|---|---|
| WO | WO99/57418 | 11/1999 |
| WO | WO00/79423 | 12/2000 |
| WO | WO01/06091 | 1/2001 |
| WO | WO01/27755 | 4/2001 |
| WO | WO01/27858 | 4/2001 |
| WO | WO02/06857 | 1/2002 |

OTHER PUBLICATIONS

PCT International Search Report and Written Opinion dated Apr. 27, 2010 (12 pages).

Aarnes, J. E., Kippe, V., and Lie, K.A., Mixed Multiscale Finite Elements and Streamline Methods for Reservoir Simulation of Large Geomodels, Advances in Water Resources, Mar. 2005, pp. 257-271, vol. 28, Issue 3, Elsevier Ltd.

Arbogast, T., Numerical Subgrid Upscaling of Two-Phase Flow in Porous Media, Numerical Treatment of Multiphase Flows in Porous Media, Lecture Notes in Physics, 2000, vol. 552, pp. 35-49, Springer Berlin / Heidelberg.

Arbogast, T. and Bryant, S.L., Numerical Subgrid Upscaling for Waterflood Simulations, SPE Reservoir Simulation Symposium, Feb. 11-14, 2001, pp. 1-14, Paper No. 66375-MS, Society of Petroleum Engineers Inc., Houston, Texas.

Bratvedt, F., Gimse, T., and Tegnander, C., Streamline Computations for Porous Media Flow Including Gravity, Transport in Porous Media, Oct. 1996, pp. 63-78, vol. 25, No. 1, Springer Netherlands.

Busigin, A. and Phillip, C.R., Efficient Newton-Raphson and Implicit Euler Methods for Solving the HNC Equation, Molecular Physics,1992, pp. 89-101, vol. 76, Issue 1, Taylor & Francis, London.

Chen, Z. and Hou, T,Y., A Mixed Multiscale Finite Element Method for Elliptic Problems With Oscillating Coefficients, Mathematics of Computation, 2002, pp. 541-576, vol. 72, American Mathematical Society.

Chien, M.C.H., Wasserman, M.L., Yardumian, H.E., Chung, E.Y., Nguyen, T., and Larson, J., The Use of Vectorization and Parallel Processing for Reservoir Simulation, SPE Reservoir Simulation Symposium, Feb. 1-4, 1987, pp. 329-341, Paper No. 16025-MS, Society of Petroleum Engineers Inc., San Antonio, Texas.

Christie, M.A. and Blunt, M.J., Tenth SPE Comparative Solution Project: A Comparison of Upscaling Techniques, SPE Reservoir Simulation Symposium, Feb. 11-14, 2001, pp. 1-13, Paper No. 66599, Society of Petroleum Engineers Inc., Houston, Texas.

Durlofsky, L.J., Numerical Calculation of Equivalent Grid Block Permeability Tensors for Heterogeneous Porous Media, Water Resources Research, May 1991, pp. 699-708, vol. 27, No. 5, American Geophysical Union.

Durlofsky, L.J., A Triangle Based Mixed Finite Element-Finite Volulme Technique for Modeling Two Phase Flow Through Porous Media, Journal of Computational Physics, Apr. 1993, pp. 252-266, vol. 105, Issue 2, Academic Press, Inc.

Durlofsky, L.J., Jones, R.C., and Milliken, W.J., A Nonuniform Coarsening Approach for the Scale-Up of Displacement Processes in Heterogeneous Porous Media, Advances in Water Resources, Oct.-Dec. 1997, pp. 335-347, vol. 20, Issues 5-6, Elsevier Science Ltd.

Efendiev, Y.R., Hou, T.Y., and Wu, X.H., Convergence of a Nonconforming Multiscale Finite Element Method, SIAM Journal of Numerical Analysis, 2000, pp. 888-910, vol. 37, No. 3, Society for Industrial and Applied Mathematics.

Efendiev, Y.R. and Wu, X.H., Multiscale Finite Element for Problems With Highly Oscillatory Coefficients, Numerische Mathematik, Jan. 2002, pp. 459-486, vol. 90, No. 3, Springer Berlin / Heidelberg.

Fujiwara, K, Okamoto, Y., Kameari, A., Ahagon, A., The Newton-Raphson Method Accelerated by Using a Line Search-Comparison Between Energy Functional and Residual Minimization, IEEE Transactions on Magnetics, May 2005, pp. 1724-1727, vol. 41, No. 5, Institute of Electrical and Electronics Engineers, Inc. (IEEE).

Hou, T.Y. and Wu, X.H., A Muitiscale Finite Element Method for Elliptic Problems in Composite Materials and Porous Media, Journal of Computational Physics, 1997, pp. 169-189, vol. 134, Academic Press.

Jenny, P., Wolfsteiner, C., Lee, S.H., and Durlofsky, L.J., Modeling Flow in Geometrically Complex Reservoirs Using Hexahedral Multi-Block Grids, SPE Reservoir Simulation Symposium, Feb. 11-14, 2001, pp. 1-10, Paper No. 66357, Society of Petroleum Engineers Inc., Houston, Texas.

Jenny, P., Lee, S. H., Tchelepi, H. A., Adaptive Multiscale Finite-Volume Method for Multiphase Flow and Transport in Porous Media, Sep. 24, 2004, Multiscale Modeling and Simulation, vol. 3, No. 1, pp. 50-64, Society for Industrial and Applied Mathematics.

Lee, S.H., Durlofsky, L.J., Lough, M.F., and Chen, W.H., Finite Difference Simulation of Geologically Complex Reservoirs With Tensor Permeabilities, SPE Reservoir Evaluation & Engineering, Dec. 1998, pp. 567-574, Society of Petroleum Engineers Inc.

Lee, S.H., Tchelepi, H., and Dechant, L.F., Implementation of a Flux-Continuous Finite Difference Method for Stratigraphic, Hexahedron Grids, SPE Reservoir Simulation Symposium, Feb. 14-17, 1999, pp. 1-11, Paper No. 51901, Society of Petroleum Engineers Inc., Houston, Texas.

Lunati, I. and Jenny, P., Multiscale Finite-Volume Method for Compressible Multiphase Flow in Porous Media, Journal of Computational Physics, Aug. 10, 2006, pp. 616-636, vol. 216, Issue 2, Elsevier Inc.

Oak, M.J., Baker, L.E., and Thomas, D.C., Three-Phase Relative Permeability of Berea Sandstone, Journal of Petroleum Technology (JPT), Aug. 1990, pp. 1054-1061, vol. 42, No. 8, Society of Petroleum Engineers.

Salibian-Barrera, M., Fast and Stable Bootstrap Methods for Robust Estimates, Interface Foundation Annual Meeting, 2002, pp. 1-14, Montreal, QC.

Shi, G. and Liu, X., Multi-Parameter Accelerated Modified Newton-Raphson Methods for Rigid-Plastic FE Analysis, Acta Mechanica Sofide Sinica, Dec. 2002, pp. 323-331, vol. 15, No. 4, DOI 10.1007/BF02493033, The Chinese Society of Theoretical and Applied Mechanics, Beijing, China.

Tesch, J., The Newton-Raphson Method and Its Application to Fixed Points, Nov. 21, 2005, Center for Hybrid and Embedded Software Systems at the University of California, Berkeley, Berkeley, California.

Wallstrom, T.C., Hou, S., Christie, M.A., Durlofsky, L.J. and Sharp, D.H., Application of a New Two-Phase Upscaling Technique to Realistic Reservoir Cross Sections, SPE Reservoir Simulation Symposium, Feb. 14-17, 1999, pp. 451-462, Paper No. 51939, Society of Petroleum Engineers Inc., Houston, Texas.

Hadi Hajibeyge et al., Iterative Multiscale Finite-vol. Method, Journal of Computational Physics, Jun. 2008, vol. 227, Issue 19, pp. 8604-8621.

Ivan Lunati, Patrick Jenny; The Multiscale Finite vol. Method: A flexible tool to model physically complex flow in porous media, In: 10th European Conference on the Mathematics of Oil Recover—Amsterdam. The Netherland, Sep. 2006.

Vegard Kippe et al., A Comparison of Multiscale Methods for Elliptics Problems in Porous Media Flow, Computational Geosciences, Feb. 2008, vol. 12, No. 3, pp. 377-398, ISSN 1420-0597 (print) 1573-1499 (online).

* cited by examiner

MULTI-SCALE METHOD FOR MULTI-PHASE FLOW IN POROUS MEDIA

RELATED APPLICATIONS

The present application for patent claims the benefit of provisional patent application U.S. Ser. No. 61/053,980, filed May 16, 2008, which the entirety of the application is incorporated herein by reference.

FIELD OF THE INVENTION

The present invention is generally directed to simulators for characterizing subsurface formations, and more particularly, to simulators that use multi-scale methods to simulate fluid flow within the subsurface formations.

BACKGROUND OF THE INVENTION

Current reservoir simulators are encumbered by the level of detail available for very large, fine-scale reservoir models, which often are composed of millions of grid cells. The quality of reservoir simulation is very dependent on the spatial distribution of reservoir properties; namely porosity and permeability. The permeability of subsurface formations typically displays high variability levels and complex structures of spatial heterogeneity that spans a wide range of length scales. As a result, a large amount of effort towards developing reservoir simulators has been dedicated to better characterizing reservoir properties and developing efficient numerical algorithms for high-resolution models.

Simulation methods employing multi-scale algorithms have shown great promise in efficiently simulating high-resolution models for subsurface reservoirs having highly heterogeneous media. For example, one proposed multi-scale method includes a nested dual grid approach for simulation of both flow and transport in heterogeneous domains. The nested grids are employed to construct a fine-scale flow field and solve the saturation equations along streamlines. Generally, multi-scale methods can be categorized into multi-scale finite-element (MSFE) methods, mixed multi-scale finite-element (MMSFE) methods, and multi-scale finite-volume (MSFV) methods.

Most multi-scale approaches for flow in porous media are designed to develop a coarse-scale pressure equation from the elliptic pressure equation and reconstruct the fine-scale pressure field via basis functions. The hyperbolic (or parabolic) transport equation in fine-scale is then directly or iteratively solved for saturations. The coarsening of the transport equation is much more challenging than that of the elliptic pressure equation. The hyperbolic nature of transport equation entails prolongation and restriction operations of saturation that are strongly dependent on the history of saturation development in a coarse-scale grid with specific underlying heterogeneous permeability distribution. Especially, as the correlation length of permeability is often much larger than the coarse-scale grid size, it is less probable that universal prolongation and restriction operators for saturation can be devised in a functional form of system variables and/or characteristic parameters.

Many approaches have been proposed as alternative computational methods to fine-grid simulation; however, these methods have typically been prone to significant error or have proven to be only slightly less expensive than full simulation of the fine-scale grid. There is a need for a more efficient multi-scale numerical algorithm that can be used to simulate a very large, fine-scale reservoir model. Ideally, the method would provide for accurate interpolation or extrapolation of physical phenomena in one scale to a different scale, such that the effects of the fine-scale are correctly captured on the coarse-scale grid.

SUMMARY OF THE INVENTION

According to an aspect of the present invention, a multi-scale method is disclosed for use in simulating fluid flow in a subsurface reservoir. The method includes providing a simulation model for a subsurface reservoir that includes a fine-scale grid defining a plurality of fine-scale cells, and a coarse-scale grid defining a plurality of coarse-scale cells that are aggregates of the fine-scale cells. Saturation regions, which correspond to each coarse-scale cell, are defined responsive to predetermined saturation properties. The saturation regions are assembled to obtain a fine-scale saturation distribution and a visual display is output responsive to the fine-scale saturation distribution.

The saturation properties can include being saturated by an injection fluid less than a predetermined amount, having a saturation change less than a predetermined amount, or having a total velocity change of the injection fluid less than a predetermined amount.

One type of saturation region contains coarse-scale cells that have been saturated by an injection fluid less than a first predetermined amount. Determining the fine-scale saturation for this saturation region can include assigning the fine-scale saturation a value of zero.

Another type of saturation region contains coarse-scale cells that have been saturated by at least the first predetermined amount, have a saturation change that is at least a second predetermined amount, and have a total velocity change that is at least a third predetermined amount. Determining the fine-scale saturation for this saturation region can include computing the fine-scale saturation using a Schwarz-Overlap method.

Another type of saturation region contains coarse-scale cells that have been saturated by at least the first predetermined amount, have a saturation change that is less than the second predetermined amount, and have a total velocity change that is less than the third predetermined amount. Determining the fine-scale saturation for this saturation region can include using a prolongation operator that is selected responsive to a relative saturation change of the injection fluid in the fine-scale cells. The prolongation operator can perform interpolate a local velocity field and compute fine-scale saturation responsive to the local velocity field, or interpolate fine-scale saturation from coarse-scale saturation.

Another aspect of the present invention includes a multi-scale method for use in simulating fluid flow in a subsurface reservoir. The method includes providing a simulation model for a subsurface reservoir that has a fine-scale grid defining a plurality of fine-scale cells, and a coarse-scale grid defining a plurality of coarse-scale cells that are aggregates of the fine-scale cells. If the coarse-scale cells have been saturated by the injection fluid less than a predetermined amount, the fine-scale saturation is assigned a value of zero. If the injection fluid has saturated the coarse-scale cells by at least the predetermined amount, the fine-scale saturation is determined using a prolongation operator. The course-scale cells are assembled to obtain a fine-scale saturation distribution and a visual display is output responsive to the fine-scale saturation distribution.

The prolongation operator can perform a Schwarz-Overlap method of prolongation, interpolate a local velocity field and compute fine-scale saturation responsive to the local velocity field, or interpolate fine-scale saturation from coarse-scale saturation. The prolongation operator can be determined based on saturation changes, total velocity changes, relative saturation changes, or a combination thereof in the coarse-scale cells.

Another aspect of the present invention includes a multi-scale method for use in simulating fluid flow in a subsurface reservoir. The method includes providing a simulation model for a subsurface reservoir that has a fine-scale grid defining a plurality of fine-scale cells, and a coarse-scale grid defining a plurality of coarse-scale cells that are aggregates of the fine-scale cells. The fine-scale saturation for coarse-scale cells that have been saturated by an injection fluid less than a first predetermined amount are assigned a value of zero. The fine-scale saturation is computed using a Schwarz-Overlap method for coarse-scale cells that have been saturated by the injection fluid by at least the first predetermined amount, have a saturation change that is at least a second predetermined amount, and have a total velocity change that is at least a third predetermined amount. The fine-scale saturation is interpolated using a prolongation operator for coarse-scale cells that have been saturated by the injection fluid by at least the first predetermined amount, have a saturation change that is less than a second predetermined amount, and have a total velocity change that is less than a third predetermined amount. The saturation regions are assembled to obtain a fine-scale saturation distribution. This process can be repeated over a series of time steps to simulate fluid flow in the subsurface reservoir and a visual display can be output responsive to the simulated fluid flow.

The prolongation operator can be selected responsive to a relative saturation change of the injection fluid in the fine-scale cells. The prolongation operator can interpolate a local velocity field and compute fine-scale saturation responsive to the local velocity field, or interpolate fine-scale saturation from coarse-scale saturation.

DETAILED DESCRIPTION OF THE INVENTION

Figure 1:
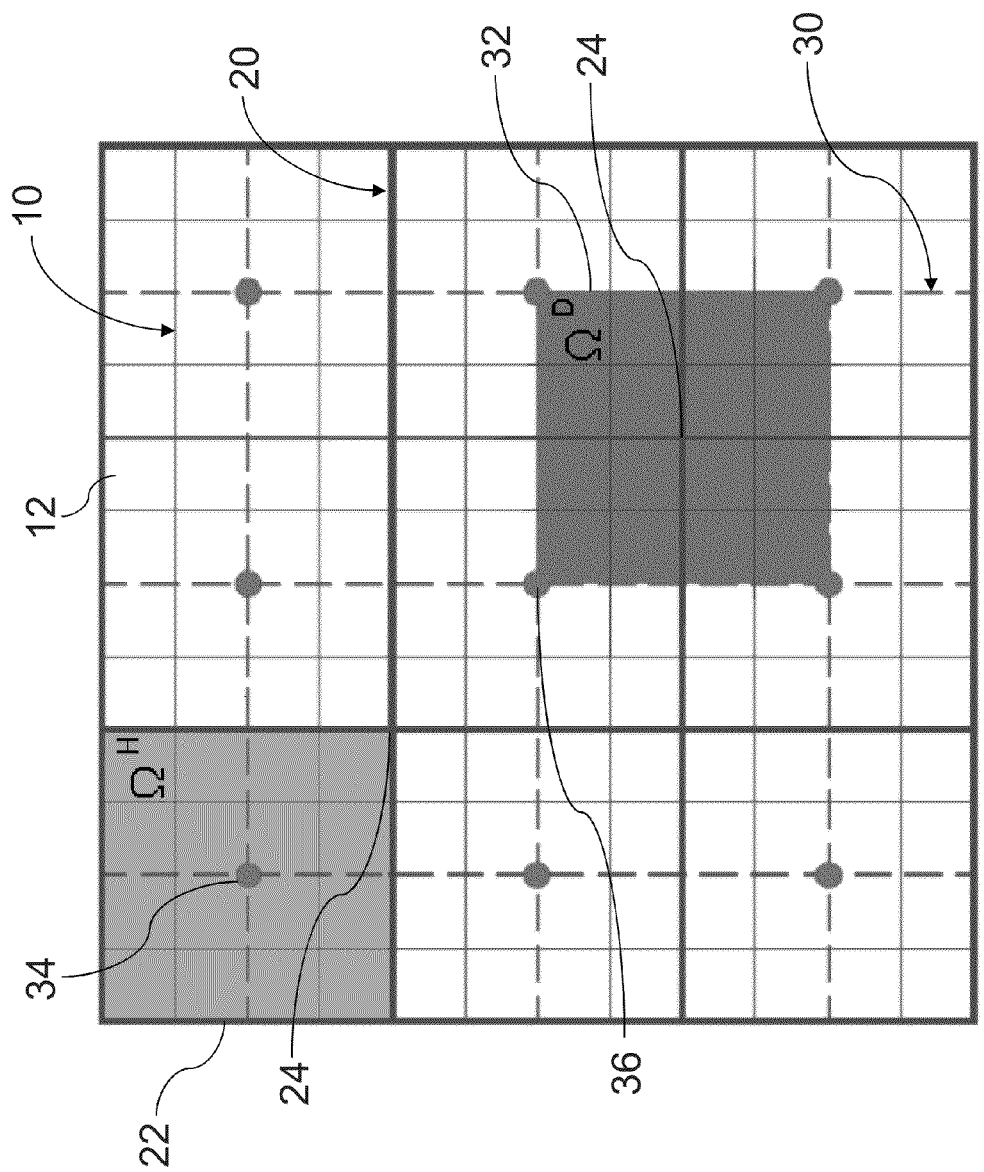
FIG. 1 is an illustration of a domain representative of a subsurface reservoir partitioned into a 2D fine-scale grid (solid lines), a primal coarse-scale grid (bolded solid lines), and dual coarse-scale grid (dashed lines), in accordance with the present invention.

Embodiments of the present invention described herein are generally directed to a multi-scale method to efficiently determine the fine-scale saturation arising from multi-phase flow in a subsurface reservoir, particularly for use in a reservoir simulator. As will be described herein in more detail, an adaptive coarse-scale operator for the transport equation of saturation is utilized to overcome the hyperbolic characteristics of the governing equations, intricate nonlinear interactions of a saturation front and underlying heterogeneous permeability distribution.

Governing Equations and Discretized Formulation

Two phase, incompressible flow in a heterogeneous domain, such as oil and water in a subterranean formation, may be mathematically represented by:

$$\Phi \frac{\partial S_o}{\partial t} - \frac{\partial}{\partial x_i}\left(k \frac{k_{r_o}}{\mu_o} \frac{\partial p}{\partial x_i}\right) = -q_o \quad \text{(Equation 1)}$$

$$\Phi \frac{\partial S_w}{\partial t} - \frac{\partial}{\partial x_i}\left(k \frac{k_{r_w}}{\mu_w} \frac{\partial p}{\partial x_i}\right) = -q_w \quad \text{(Equation 2)}$$

on volume $\Omega$, where p is the pressure, $S_j$ are the saturations (the subscript j stands for phase; o for oil and w for water) with $0 \leq S_j \leq 1$ and $S_v + S_w = 1$, k is the heterogeneous permeability, $k_{r_j}$ are the relative permeabilities (which are functions of $S_j$), $\mu_j$ the viscosities and $q_j$ are source terms which represent the wells. The symbol $\Phi$ denotes porosity and t time. Notation $S = S_o$ will be used hereinafter. The system assumes that capillary pressure and gravity are negligible. Equivalently, Equations (1) and (2) can be rewritten as $$\nabla \cdot \lambda \nabla p = q_o + q_w \quad \text{(Equation 3)}$$

$$\Phi \frac{\partial S}{\partial t} + \nabla \cdot (f_o u) = -q_o \quad \text{(Equation 4)}$$

on $\Omega$ and the total velocity becomes $$u = -\lambda \nabla p \quad \text{(Equation 5)}$$

with total mobility and oil-phase fractional flow:

$$\lambda = k(k_o + k_w) \quad \text{(Equation 6)}$$

$$f_o = \frac{k_o}{k_o + k_w} \quad \text{(Equation 7)}$$

Here, $k_j \equiv k_{r_j}/\mu_j$ for $j \in \{o, w\}$. The permeability heterogeneity is a dominant factor that dictates the flow behavior in natural porous formations. The heterogeneity of permeability k is usually represented as a complex multi-scale function of space. Moreover, as k tends to be highly discontinuous, resolving the spatial correlation structures and capturing the variability of permeability requires highly detailed descriptions.

On the boundary $\partial \Omega$ the flux $u \cdot n$ is specified, where n is the boundary unit normal vector pointing outward. Equations (3) and (4) are a representative description of the type of systems that are typically handled efficiently by a subsurface flow reservoir simulator. Note that the ability to handle the limiting case of incompressible flow ensures that compressible systems can also be solved because the compressibility makes the system of governing equations less stiff.

The discrete form of Equation (3) for cell i becomes $$\sum_{j \in N_i} \lambda_{ij} t_{ij} (p_j - p_i) = q_{o,i} + q_{w,i} \quad \text{(Equation 8)}$$

Here $N_i$ denotes the neighboring cells of cell i; and $\lambda_{ij}$ and $t_{ij}$ denote the mobility and transmissibility at the interface of cells i and j, respectively. The discretized transport equation becomes $$\frac{\Phi V_i}{\Delta t}(S_i^{n+1} - S_i^n) = \sum_{j \in N_i} f_{o,ij} u_{ij} = -q_{o,i} \quad \text{(Equation 9)}$$

where the discrete velocity at the interface of cells i and j is given by $$u_{ij} = t_{ij} \lambda_{ij} (p_j - p_i) \quad \text{(Equation 10)}$$

Restriction and Prolongation Operations

The original fine-scale domain can be denoted as $\Omega^h$ and the coarse-scale domain as $\Omega^H$ with H>>h. The $\Omega^h$ and $\Omega^H$ represent not only the space with grid scale h and H, respectively, but also the space of vectors defined on the grid. The linearized pressure equation and the nonlinear saturation equation in $\Omega^h$ can be written as $$L^h p^h + q^h = 0 \text{ for } p^h \in \Omega^h \quad \text{(Equation 11)}$$

$$A^h(S^h) + r^h = 0 \text{ for } S^h \in \Omega^h \quad \text{(Equation 12)}$$

The pressure equation is a linear equation for $p^h$ that includes a linear operator L. The saturation equation is a nonlinear equation because of the nonlinear functional dependency of fractional flow on saturations, which is manifested with a nonlinear operator A in Equation (12). The nonlinear Equation (12) can be iteratively solved using Newton's method. The restriction and prolongation operators for pressure can be defined:

$$p^H = R_h^H p^h \quad \text{(Equation 13)}$$

$$p^h = I_H^h p^H. \quad \text{(Equation 14)}$$

The pressure equation can then be written as $$R_h^H L^h I_H^h p^H + R_h^H q^h = 0 \quad \text{(Equation 15)}$$

when the coarse-scale grid operator is defined by $$L^H = R_h^H L^h I_H^h \quad \text{(Equation 16)}$$

Equation (15) can be written in coarse-scale grid format:

$$L^H p^H + q^H = 0 \text{ for } p^H \in \Omega^{hH} \quad \text{(Equation 17)}$$

Similarly, the restriction and prolongation operators for the saturation equation can be defined:

$$S^H = R_h^H S^h \quad \text{(Equation 18)}$$

$$S^h = I_H^h S^H \quad \text{(Equation 19)}$$

Equation (12) can then be written:

$$R_h^H A^h (I_H^h S^H) + R_h^H r^h = 0 \text{ for } S^H \in \Omega^H \quad \text{(Equation 20)}$$

Equation (20) can be rewritten in a coarse-scale grid operator and the tau correction due to the nonlinearity of A:

$$A^H(S^H) + R_h^H r^h - \tau_h^H = 0 \text{ for } S^H \in \Omega^H \quad \text{(Equation 21)}$$

where the tau correction $\tau_h^H$ is defined by $$\tau_h^H = A^H(R_h^H S^h) - R_h^H A^h(S^h) \quad \text{(Equation 22)}$$

Multi-scale Finite Volume Approximation
Restriction and Prolongation Operators for Pressure In the multi-scale finite volume method, taught in U.S. Pat. Nos. 6,823,297 and 7,496,488, which are herein incorporated by reference, basis functions in the dual coarse-scale grid are employed to construct prolongation and restriction operators for pressure.

Referring to FIG. 1, a domain representative of a subsurface reservoir is partitioned into a 2D fine-scale grid 10 with fine-scale cells 12. A conforming primal coarse-scale grid 20 (shown in bolded solid line), with M cells 22 and N nodes 24, is constructed on the original fine-scale grid. Each primal coarse-scale cell 22, $\Omega_i^H$ ($i \in \{1, \ldots, M\}$), is composed of multiple fine-scale cells 12. A dual coarse-scale grid 30 (shown in dashed line), also conforming to the fine-scale grid 10, is constructed such that each dual coarse-scale cell 32, $\Omega_j^D$ ($j \in \{1, \ldots, N\}$), contains exactly one node 24 of the primal coarse-scale grid 20 in its interior. Generally, each node 24 is centrally located in each dual coarse-scale cell 32. The dual coarse-scale grid 30 also has M nodes 34, $x_i$ ($i \in \{1, \ldots, M\}$), each located in the interior of a primal coarse-scale cell 22, $\Omega_i^H$. Generally, each dual coarse-scale node 34 is centrally located in each primal coarse-scale cell 22. The dual coarse-scale grid 30 is generally constructed by connecting nodes 34 that are contained within adjacent primal coarse-scale cells 22. Each dual coarse-scale cell 32 has $N_c$ corners 36 (four in two dimensions and eight in three dimensions). A set of dual basis functions, $\Theta_j^i$, is constructed; one for each corner i of each dual coarse-scale cell $\Omega_j^D$.

Numerical basis functions are constructed for the coarse-scale dual grid 30 ($\omega^D$) in FIG. 1. Four dual basis functions, $\Theta^i$ (i=1,4) (8 basis functions for 3d) are constructed for each dual coarse-scale cell 32 by solving the elliptic problem $$\nabla \cdot (\lambda \cdot \nabla \Theta_j^i) = 0 \text{ on } \omega_j^D \quad \text{(Equation 23)}$$

with the boundary condition $$\frac{\partial}{\partial x_i}(\lambda \cdot \nabla \Theta_j^i) = 0 \text{ on } \partial \Omega_j^D \quad \text{(Equation 24)}$$

where $x_i$ is the coordinate tangent to the boundary of $\Omega_i^D$. The value of the node $x_k$ of $\Omega_j^D$ is given by $$\Theta_j^i(x_k) = \delta_{ik} \quad \text{(Equation 25)}$$

where $\delta_{ik}$ is the Kronecker delta. By definition $\Theta_j^i(x) \equiv 0$ for $x \notin \Omega_j^D$. Once the basis functions are computed, the prolongation operator ($I_H^h$) can be readily written as $$p_j^h(x) = I_H^h(p^H) = \sum_i \Theta_j^i p_i^H \text{ for } x \in \Omega_j^D \quad \text{(Equation 26)}$$

where the fine-scale grid pressure $p_j^h \in \Omega^h$ and the coarse-scale grid pressure $p_i^H \in \Omega^H$. The prolongation operator ($I_H^h$) is a linear combination of dual grid basis functions.

Figure 2:
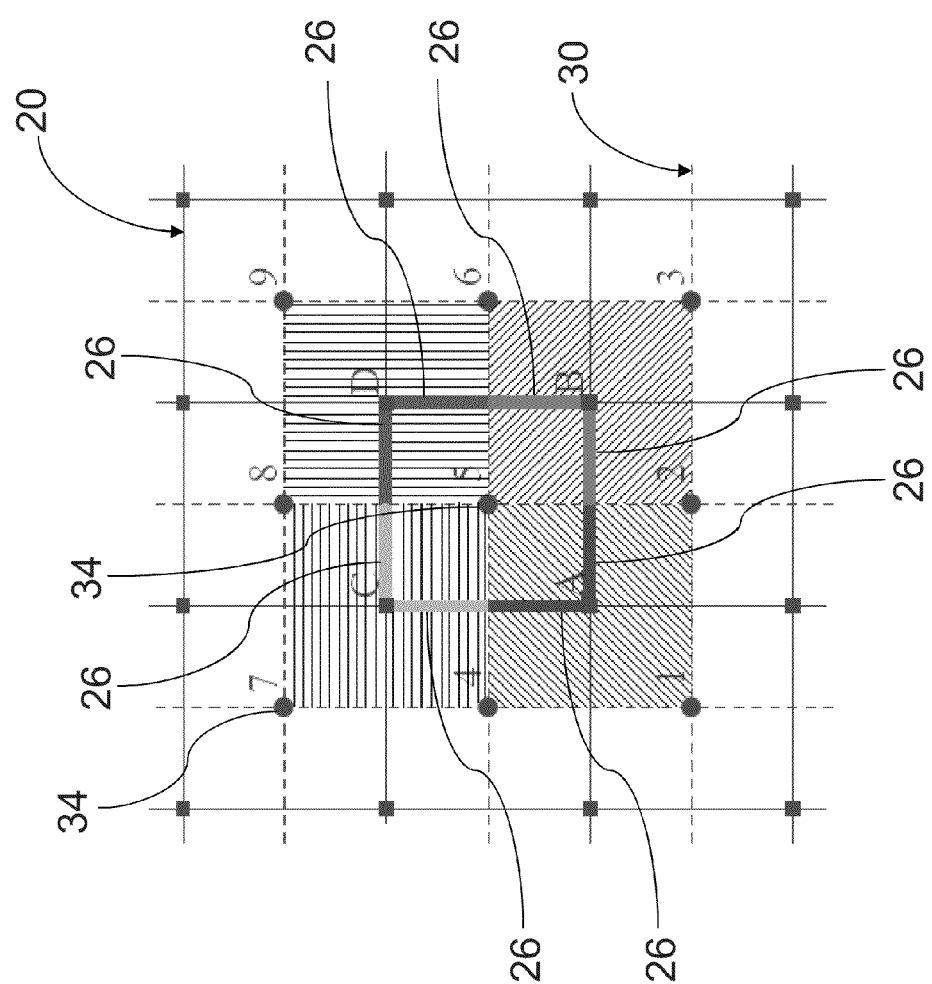
FIG. 2 is an illustration of a domain representative of a subsurface reservoir partitioned into a primal coarse-scale grid with nine adjacent coarse-scale cells (1-9) and a dual coarse-scale grid with four adjacent dual coarse-scale cells (A-D), in accordance with the present invention.

FIG. 2 shows eight adjacent primal coarse-scale or coarse-scale cells shown in solid line, $\Omega_j^D$=(i=1-4,6-8) for the coarse-scale cell $\Omega_5^H$ on coarse-scale grid 20. A dual coarse-scale grid 30, shown in dashed line, with dual coarse-scale cells, $\Omega_j^D$ (j=A, B, C, D), is shown in FIG. 2 by cross-hatching. The coarse-scale grid operator can be constructed from the conservation equation for each coarse-scale cell. The first step is to compute the fluxes across the coarse-scale cell interface segments 26, which lie inside $\Omega^H$, as functions of the coarse-scale pressures $p^H$ in the coarse-scale volumes 1-9. This is achieved by constructing eight dual basis functions, $\Theta^i$ (i=1,8), one for each adjacent coarse-scale cell. The fine-scale fluxes within $\Omega^H$ can be obtained as functions of the coarse-scale pressures $p^H$ by superposition of these basis functions. Effective coarse-scale transmissibilities are extracted from the dual basis functions $\Theta_j^i$. A set of fine-scale basis functions, $\Theta_i^k$, are constructed for each coarse-scale cell $\Omega_i^H$ such that one basis function is constructed for each adjacent coarse-scale cell $\Omega_k^H$, which includes $\Omega_i^H$. The boundary conditions for the local computations of the fine-scale basis functions are extracted from the dual basis functions. Finally, given a coarse-scale solution $p_i^H$, the phase flux across the interface, $$\partial \Omega_{i_1 i_2}^H = \partial \Omega_{i_1}^H \cap \partial \Omega_{i_2}^H. \quad \text{(Equation 27)}$$

is approximated by $$F_l^{i_1 i_2} = \sum_{i=1}^{M} T_{l,i}^{i_1 i_2} p_i^H \text{ for } l = o, w \quad \text{(Equation 28)}$$

where $T_{l,i}^{i_1 i_2}$ are phase transmissibilities given by $$T_{l,i}^{i_1 i_2} = \int_{\partial \Omega_{i_1 i_2}^H} \sum_{j=1}^{N} (\lambda_l^i \cdot \nabla \Theta_j^i) \cdot n d\Gamma \quad \text{(Equation 29)}$$

The vector n is the unit normal of $\partial \Omega_{i_1 i_2}^H$ pointing in the direction from $\Omega_{i_1}^H$ to $\Omega_{i_2}^H$. From the coarse-scale grid transmissibilities, the coarse-scale grid equations are obtained:

$$L^H p^H = T p^H = -q^H \text{ for } p^H \notin \Omega^H \quad \text{(Equation 30)}$$

where T is the coarse-scale grid transmissibility operator for pressure.

Restriction and Prolongation Operators for Saturation

In order to maintain the mass conservation in coarse-scale and fine-scale grids, the choice of the restriction operator for saturation is rather limited to a volumetric average:

$$S_i^H = R_h^H S^h = \frac{1}{V_i} \sum_{l \in \Omega_i^H} v_l S_l^h \quad \text{(Equation 31)}$$

where $v_l$ is the volume of fine-scale cell l and $V_i$ is the volume of coarse-scale cell i. If the phase velocity in fine-scale grid 10 is given, the nonlinear fine-scale grid operator can be written as $$A_i^h(S^H) = \sum_{j \in N_i} \frac{k_o(S_{o,ij}^h)}{k_o(S_{o,ij}^h) + k_w(S_{w,ij}^h)} u_{ij} - \beta_i (S_i^{h,n+1} - S_i^{h,n}) \quad \text{(Equation 32)}$$

Here, $$\beta_i = \frac{\Phi V_i}{\Delta t} \quad \text{(Equation 33)}$$

The $S_{ij}$ and $u_{ij}$ denote the upwind saturation and the total phase velocity between cells i and j, respectively. Furthermore, the coarse-scale grid total velocity and fractional flow are defined as $$U_{ij}^H = \sum_{l \in \partial \Omega_{ij}^H} u_l^h \quad \text{(Equation 34)}$$

$$F_{ij}^H = \frac{1}{U_{ij}^H} \sum_{l \in \partial \Omega_{ij}^H} f(S_l^h) u_l^h \quad \text{(Equation 35)}$$

The fractional flow curve $f(S_l^h)$ is a nonlinear function (i.e., S-shaped) and in addition, multi-phase flow intricately interacts with heterogeneous permeability. The coarse-scale grid fractional flow $F_{ij}^H$ is, in general, a complex nonlinear function of $S^h$ that cannot be easily represented only by a function of the coarse-scale grid saturation, $S^H$. However, if the saturation in a coarse-scale grid monotonically increases or decreases, after the multi-phase flow front moved through the grid, the coarse-scale grid fractional flow curve can be estimated from the saturation changes of the previous time step or iteration. The saturation change in a fine-scale grid can be expressed as a fraction of the coarse-scale grid saturation change by:

$$\xi_l = \frac{\delta S_l^h}{\delta S_i^H} \text{ for } l = \in \Omega_i^H \tag{Equation 36}$$

The fractional flow curve can be linearized as $$f(S_l^h + \delta S_l^h) \simeq f(S_l^h) + \frac{\partial f}{\partial S_l^h} \xi_l \delta S_i^H \tag{Equation 37}$$

$$F_{ij}^H(S_i^H + \delta S_i^H) \simeq F_{ij}^H(S_i^H) + \frac{\delta S_i^H}{U_{ij}^H} \sum_{l \in \partial \Omega_{ij}^H} \frac{\partial f}{\partial S_l^h} \xi_l u_l^h \tag{Equation 38}$$

With a model for the coarse-scale grid fractional flow, the coarse-scale grid nonlinear operator can now be written as $$A_i^H(S^H) = U_{ij}^H F_{ij}^H - \beta_i(S_i^{H,n+1} - S_i^{H,n}) \tag{Equation 39}$$

A prolongation operator that interpolates the coarse-scale grid saturation to the fine-scale grid saturation may now be derived.

Prolongation Operator I:

For a domain where a reliable prolongation operator has not been conceived, the fine-scale grid solution can be directly computed via the Schwarz-Overlap method. When an invading fluid moves in a coarse-scale grid, a stiff saturation front, as in the Buckley-Leverett equation, experiences intricate nonlinear interactions with the underlying heterogeneous permeability field. The Schwarz-Overlap method of prolongation was solely used in the original Multi-Scale Finite Volume method for solving the transport equation. While this numerical prolongation is accurate, it is also computationally expensive. Embodiments of the present invention employ this prolongation operator adaptively for the domain in which the invading fluid first moves in and generates a rapid saturation change. Solving Equation (12) for the domain $\Omega_i^H$:

$$A_i^h(S^{h,\nu+1}) + r^{h,\nu+1} = 0 \text{ for } S^h \epsilon \Omega_i^H \tag{Equation 40}$$

with the Neumann boundary conditions:

$$S_{ij,l}^{h,\nu+1} = S_{ij,l}^{h,\nu}, u_{ij,l}^{h,\nu+1} = u_{ij,l}^{h,\nu} \text{ for } l \epsilon \partial \Omega_i^H \cap \partial \Omega_j^H \tag{Equation 41}$$

The superscript $\nu$ indicates the iteration level and the approximation of Equation (41) provides the localization of the problem so that the equation can be solved for each coarse-scale grid. From Equation (31) the coarse-scale grid variables can be directly computed. The first method is locally conservative and accurate in constructing fine-scale grid saturations; however, it may entail several iterative implicit computations of saturations in primal coarse-scale grids with Neumann boundary conditions to obtain a true globally converged solution.

Prolongation Operator II:

The second prolongation operator comprises two steps: (1) reconstruction of locally conservative fine-scale grid velocity via a direct interpolation of coarse-scale grid velocity and (2) explicit computation of fine-scale grid saturations. Assume that the coarse-scale grid velocity and fine-scale grid velocity distribution are given from the previous time step or the previous iteration ($\nu$); $U_i^{H,\nu}$ for coarse-scale grid i and $u_j^{h,\nu}$ for fine-scale grid $j \epsilon \Omega_i^H$. From the coarse-scale grid solution of Equation (30), a new coarse-scale grid velocity: $U_i^{H,\nu+1}$ may be obtained. In the case that the velocity does not change much, one can interpolate the coarse-scale grid velocity change to fine-scale grid velocity at the new iteration level by $$u_j^{h,\nu+1}(x) = u_j^{h,\nu}(x) + U_i^{H,\nu+1}(x_0) - U_i^{H,\nu}(x_0) + \frac{x - x_0}{|x_1 - x_0|} \otimes \tag{Equation 42}$$
$$(U_i^{H,\nu+1}(x_1) - U_i^{H,\nu}(x_1) - U_i^{H,\nu+1}(x_0) + U_i^{H,\nu}(x_0))$$

where $u \otimes v = (u_1 v_1, u_2 v_2)$ and $x_0$ and $x_1$ are the coordinates of the coarse-scale grid at the bottom-left and top-right corners, respectively. If $u_j^{h,\nu}$ and $U^{H,\nu+1}$ are conservative in the fine-scale grid and in the coarse-scale grid, respectively, the interpolated fine-scale grid velocity, $u_j^{h,\nu+1}$, is also conservative in the fine-scale grid. Once the fine-scale grid velocity is estimated, the saturation can be inexpensively computed by an explicit method:

$$S_j^{h,\nu+1} = S_j^{h,\nu} + \frac{\Delta t}{v_j} \sum_l u_l^{h,\nu+1} f(S_j^{h,\nu}) \tag{Equation 43}$$

The stability of the explicit saturation calculation will be governed by the CFL number, which can be written as:

$$CFL = u_t \frac{\partial f(S_j^h)}{\partial S_j^h} \frac{\Delta t}{\Delta x} \tag{Equation 44}$$

The CFL number should be less than one for stability of the explicit calculation. If this algorithm applies in the domain where $\partial f(S_j^h)/\partial S_j^h \ll 1$ (i.e., rarefaction behind the Buckely-Leverett front), the time step size restriction will be minor. If there is a time step size restriction due to the stability, multiple time stepping or an implicit formulation can be used:

$$S_j^{h,\nu+1} = S_j^{h,\nu} + \frac{\Delta t}{v_j} \sum_l u_l^{h,\nu+1} f(S_j^{h,\nu+1}) \tag{Equation 45}$$

Prolongation Operator III:

A fast interpolation of saturation that is locally conservative in coarse-scale grid is now devised. If the saturation distribution pattern does not change much between iterations or time steps, the fine-scale grid saturation may be computed from the coarse-scale grid saturation change:

$$S_l^{h,\nu+1} = S_l^{h,\nu} + \xi_l \partial S_i^H \tag{Equation 46}$$

Here, it is assumed that the relative saturation change ($\xi_l$) does not vary much from the previous iteration. It is a plausible approximation for a coarse-scale grid in which the saturation changes are slow behind a steep saturation front. Clearly the accuracy of this interpolator depends on the assumption of invariant $\xi_l$ from the previous iteration. As will be shown in the following numerical examples, one can identify domains where this simple interpolator can be safely applied to yield high numerical efficiency and accuracy. Note that the above prolongation operator does not warrant saturation conservation in fine-scale grid, but the saturation is conservative in coarse-scale grid. This therefore, may yield non-conservative errors in the fine-scale grid saturations. Nevertheless, they may remain small and bounded because this prolongation operator is applied only in the region where the saturation changes slowly and the coarse-scale saturation, furthermore, is always locally conservative.

Fine-Scale Pressure for Conservative Velocity Field

The original Multi-Scale Finite Volume method observed that the fine-scale grid velocity constructed by the coarse-scale pressure values $p_i^H$ and the dual basis functions $\Theta_j^i$ yields local mass balance errors near the interfaces between coarse-scale dual cells or volumes. A second set of basis functions was proposed to construct a conservative velocity field. Using the fine-scale fluxes obtained from the dual basis functions as boundary conditions when computing the fine-scale basis functions is crucial for ensuring that the reconstructed fine-scale velocity field is conservative. The fine-scale fluxes across coarse-scale cell interfaces 26 are extracted from the interior of dual coarse-scale cells (See FIG. 2). The fine-scale basis functions (27 for 3-d and 9 for 2-d) are constructed by solving the pressure equation with the boundary fluxes that are calculated from the dual basis functions for each node. There are two numerical difficulties in this second basis function approach. The computational amount is substantially large because of a large number of the second basis function (27 for 3-d) and the basis function method is limited to a linear system where the superposition rule can be applied. Even though an adaptive method can be employed to eliminate unnecessary computation of the second basis functions, the large number of basis functions does not warrant that this approach is numerically more efficient than a direct method of computing the velocity and saturation for every time step or iteration. Furthermore, this direct approach does not require a strict linearity of the governing equations that can be easily extended to include many non-linear effect of the equations; namely, compressibility, capillary pressure, relative permeability, etc.

From the coarse-scale grid pressure solution and the dual coarse-scale grid basis functions, the fine-scale grid pressure field is constructed in the primal coarse-scale grid, $\partial \Omega^H$, as shown in FIG. 2. Neumann boundary conditions are applied along the primal coarse-scale grid, $\partial \Omega^H$:

$$u' = u'_o + u'_w = \lambda_o \cdot \nabla p + \lambda_w \cdot \nabla p \quad \text{(Equation 47)}$$

and Equation (3) is solved for the fine-scale velocity. In order to obtain a conservative velocity field u that conforms to u', the requirement:

$$u \cdot n = u' \cdot n \quad \text{(Equation 48)}$$

is imposed at the interfaces between coarse-scale cells, where n is the interface unit normal vector. The local fine-scale solution is the solution of Equation (3) with the local boundary conditions of Equation (48) and the local pressure solution that is readily converted to velocities. Note that when using Prolongation Operators II or III for the saturation transport equation, the fine-scale velocity is either linearly constructed or not computed at all. Thus much computational efficiency can be obtained in applying these prolongation operators.

Sequential Fully Implicit Scheme

An implicit Multi-Scale Finite Volume algorithm for numerical stability is also known in the art. Each time step consists of a Newton loop and the multi-phase flow problem is solved iteratively in two stages. First in each Newton step, the pressure equation is solved and the velocity field is constructed from the pressure solution. Then the transport equation is solved on the fine-scale grid by using the constructed fine-scale velocity field u. In a Schwarz-Overlap method, the transport problem is solved locally on each coarse-scale cell or volume with an implicit upwind scheme. The saturation values from the neighboring coarse-scale volumes at the previous iteration level are used for the boundary conditions. Once the transport equation is converged, the new saturation distribution determines total mobility field for the elliptic problem of the next Newton iteration. The sequential implicit Multi-Scale Finite Volume method has been tested for huge and stiff problems and the coupling scheme has not failed, even for very large time steps. Embodiments of the present invention employ the sequential fully implicit algorithm; however, fine-scale properties are adaptively constructed. By adaptively constructing pressure, velocity and saturation, a high numerical efficiency may be achieved without compromising numerical accuracy and stability.

Adaptive Scheme for Pressure

The most expensive part of the implicit Multi-Scale Finite Volume algorithm for multi-phase flow is the reconstruction of the dual basis functions that provide the restriction and prolongation operators for pressure. Therefore, to obtain a high efficiency, it is desirable to recompute them only where it is absolutely necessary. An adaptive scheme can be utilized to update these basis functions. If the condition $$\frac{1}{1+\varepsilon_\lambda} < \frac{\lambda^\nu}{\lambda_o} < 1 + \varepsilon_\lambda \quad \text{(Equation 49)}$$

is not fulfilled for all fine-scale cells inside a dual coarse-scale cell, then the dual basis functions of that control volume have to be reconstructed. Here, $\lambda^o$ denotes the total mobility when the basis functions were last updated and $\lambda^\nu$ the total mobility at the current iteration. The $\varepsilon_\lambda > 0$ is a user defined value. Note that this condition (Equation 49) is true if $\lambda$ changes by a factor which is larger than $1/(1+\varepsilon_\lambda)$ and smaller than $1+\varepsilon_\lambda$. Of coarse, these numbers depend heavily on the user defined threshold $\varepsilon_\lambda$. In general, a smaller threshold triggers more fine-scale volumes, and as a consequence more basis functions are recomputed each time step. For a wide variety of test cases, taking $\varepsilon_\lambda$ to be <0.2 yields marginal changes in the obtained results and the fraction of basis functions that need to be reconstructed is very small. In all the numerical examples, which are presented later herein, criterion $\varepsilon_\lambda$ is set to be <0.2 for updating the dual basis functions.

Adaptive Scheme for Saturation

In the original Multi-Scale Finite Volume method the transport equations are iteratively solved in fine-scale grids by a Schwartz-Overlap method. A locally-conservative fine-scale velocity field is constructed by solving local conservation equations for each coarse-scale grid with Neumann boundary conditions. The nonlinear saturations, furthermore, are iteratively solved via a Schwarz-Overlap method with the total velocity fixed. This process becomes the most time consuming part once the pressure calculation is greatly optimized via the original Multi-Scale Finite Volume method.

One restriction operator and three prolongation operators for saturation were derived above, such that an efficient algorithm may be adapted without compromising numerical accuracy. In a displacement process, an injected fluid moves from an injection well to a production well. A Buckley-Leverett-like saturation distribution will be established with complicated interactions between the saturation front and underlying heterogeneity in permeability. Embodiments of the present invention, therefore, include an adaptive algorithm by dividing the model into three regions. Region 1 is defined where the injection fluid has not reached. Region 2 is defined where an injection front has encroached and the saturation of the injection fluid increases rapidly. Region 3 is defined where the sharp front moves through and the saturation distribution among fine-scale cells is mostly established. The saturation change is slow as in the expansion fan of the Buckley-Leverett equation.

In Region 1, the fine-scale saturation does not need to be calculated because there is no change in saturation. Region 2 entails the most rigorous algorithm, Prolongation Operator I, that does not require any previous history of saturation development. In Region 3, an approximate linear interpolator, Prolongation Operators II or III, can apply and generally the choice of operators is based on fine-scale solution change that is readily available from the previously computed fine-scale saturation iteration. The Prolongation Operator II is more computationally expensive than Prolongation Operator III, but it yields a locally conservative scheme in fine-scale whereas Prolongation Operator III is only locally conservative in the coarse-scale. Thus, to ensure the non-conservative error in the fine-scale is bounded and small a good criterion is needed for utilizing Operator III in Region 3.

A criterion is needed to establish the transitions between Regions 1, 2 and 3. This criterion can be based on the saturation changes and total velocity changes in the coarse-scale grid. For example, the transition from Region 1 to Region 2 can be detected for coarse-scale grid and represented by $$\|\Delta S_i^H\| > \Delta_1 \tag{Equation 50}$$

where $\Delta_1$ is greater than zero and is generally about $10^{-5}$ to $10^{-1}$. The transition from Region 2 to Region 3 can be identified by the changes in both saturation and velocity by $$\|\Delta S_i^H\| < \Delta_2 \text{ and } \left\|\frac{\Delta U_i^H}{U_i^H}\right\| < \Delta_\upsilon \tag{Equation 51}$$

where $\Delta_2$ is generally greater than about $10^{-3}$, and more typically about $10^{-3}$ to $10^{-1}$ and where $\Delta_\upsilon$ is generally greater than about $10^{-3}$, and more typically is about $10^{-3}$ to $10^{-1}$.

To choose Operator II or III in Region 3 another criterion is needed. If the relative saturation change $\xi_l$ in Equation (46) does not fluctuate much, Operator III should yield very small fine-scale saturation errors. A variable that gauges the changes in $\xi$ for each coarse-scale cell is introduced:

$$\Xi_i \equiv \frac{\max\{\xi_{l,i}\}}{\min\{\xi_{l,i}\}} \text{ for } l \in \Omega_i^H \tag{Equation 52}$$

when the condition $$\Delta \Xi_i < \Delta_\xi \tag{Equation 53}$$

is satisfied in Region 3, Operator III can be employed. Typical ranges for $\Delta_\xi$ are from about $10^{-2}$ to $10^{-5}$ depending on how heterogeneous the reservoir model is.

As these criteria become very restrictive, the transport equation will utilize Prolongation Algorithm I more, making it more similar to the original Multi-Scale Finite Volume algorithm. The numerical errors may increase as the criteria become loose, albeit the computational efficiency improves. Other embodiments of the present invention employ other region quantities, for instance 2 or greater than 3 (i.e., 4, 5, 6, etc.), to identify the transport regions in which a different, adaptive prolongation operator is used to construct fine-scale saturation. Additionally, note that although the criteria shown herein to determine the transfer of Regions is not universal and varies based on coarse-scale characteristics (i.e., saturation change for Regions 1 to 2, and saturation and total velocity change for Regions 2 to 3), a universal transfer criteria may be employed in some embodiments.

Figure 3:
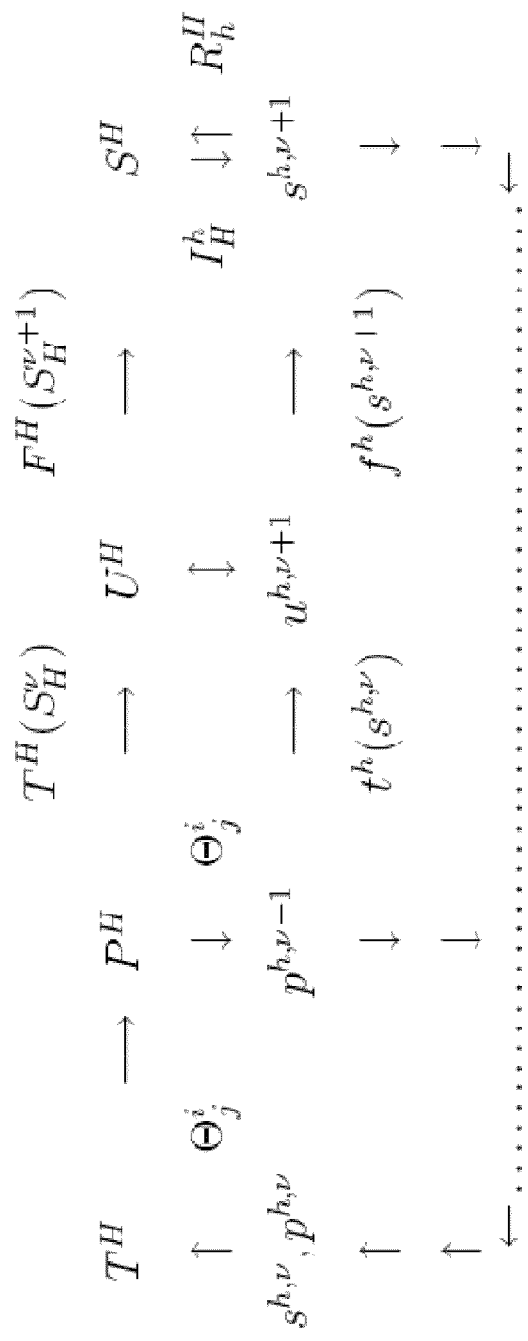
FIG. 3 is a schematic diagram of prolongation and restriction operations, in accordance with the present invention.

FIG. 3 is a schematic diagram for prolongation and restriction operators for pressure and saturation. It clearly indicates the sequential algorithmic method of pressure and saturation calculations. The algorithmic method can be described as follows with references to governing equations:

(1) Construct a primal coarse-scale grid and dual coarse-scale grid, which conform to the fine-scale grid, such that the primal coarse-scale cells and dual coarse-scale cells are aggregates of the fine-scale cells.

(2) Derive basis functions ($\Theta$) from Equation (23) and local boundary conditions from Equation (24) and Equation (25).

(3) Compute coarse-scale transmissibilities from Equation (29) by using the basis functions ($\Theta$).

(4) Construct the coarse-scale grid conservation equation from the fluxes using Equation (28) and calculate the coarse-scale grid pressure $p^H$ from Equation (30).

(5) Compute coarse-scale grid velocity from Equation (34) and coarse-scale grid saturations from Equation (39).

(6) Based on coarse-scale grid velocity and saturation changes, identify Regions 1, 2, and 3, using the criteria of Equation (50) and Equation (51). Further, apply the criterion of Equation (53) to decide the interpolation method in Region 3.

(7) For Region 1, the saturation change of the injection fluid is considered to be zero.

(8) For Region 2, construct fine-scale pressure in Equation (26), $p^h$, from the coarse-scale pressure field $p^H$ together with the basis functions ($\Theta$). Construct Neumann boundary conditions for the primal coarse-scale grid from the fine-scale pressure solution, $p^h(x)$. This pressure solution will yield a conservative fine-scale phase velocity field $u_o, u_w, u_g$. The phase velocities are then used to solve for the fine-scale saturation using Equation (40).

(9) For Region 3 with $\Delta \Xi_i \geq \Delta_\xi$, directly interpolate the fine-scale velocity from the coarse-scale velocity using Equation (42). Using the fine-scale velocity, directly compute the fine-scale saturation. Here, an explicit (Equation 43) or implicit (Equation 45) discretization scheme can be used to derive fine-scale saturation.

(10) For Region 3 with $\Delta \Xi_i < \Delta_\xi$, where the saturation changes in a coarse-scale grid are in the linear asymptotic domain, the fine-scale grid saturation will be linearly interpolated from the coarse-scale grid saturation using Equation (46), if necessary.

(11) Using the new saturation distribution the mobility field $\lambda$ is updated and the basis functions are recomputed where it is necessary (which includes updating the effective coarse-scale transmissibilities). Here an adaptive scheme is applied.

(12) If an implicit solution method is applied, one proceeds with the next Newton Raphson iteration by repeating steps 2-9, until convergence is achieved.

(13) The next time step is performed by repeating steps 2-10.

Figure 4:
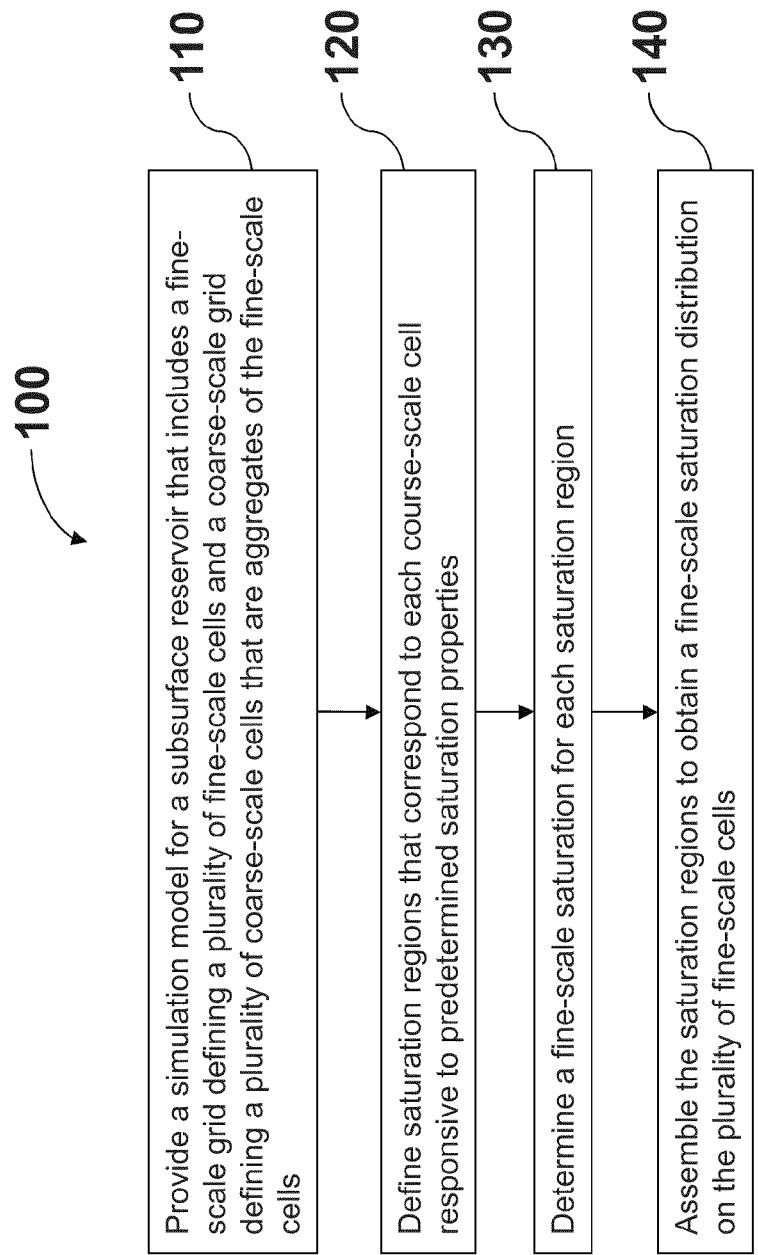
FIG. 4 is a flowchart showing the steps used in a reservoir simulator employing a multi-scale method, in accordance with the present invention.
Figure 5:
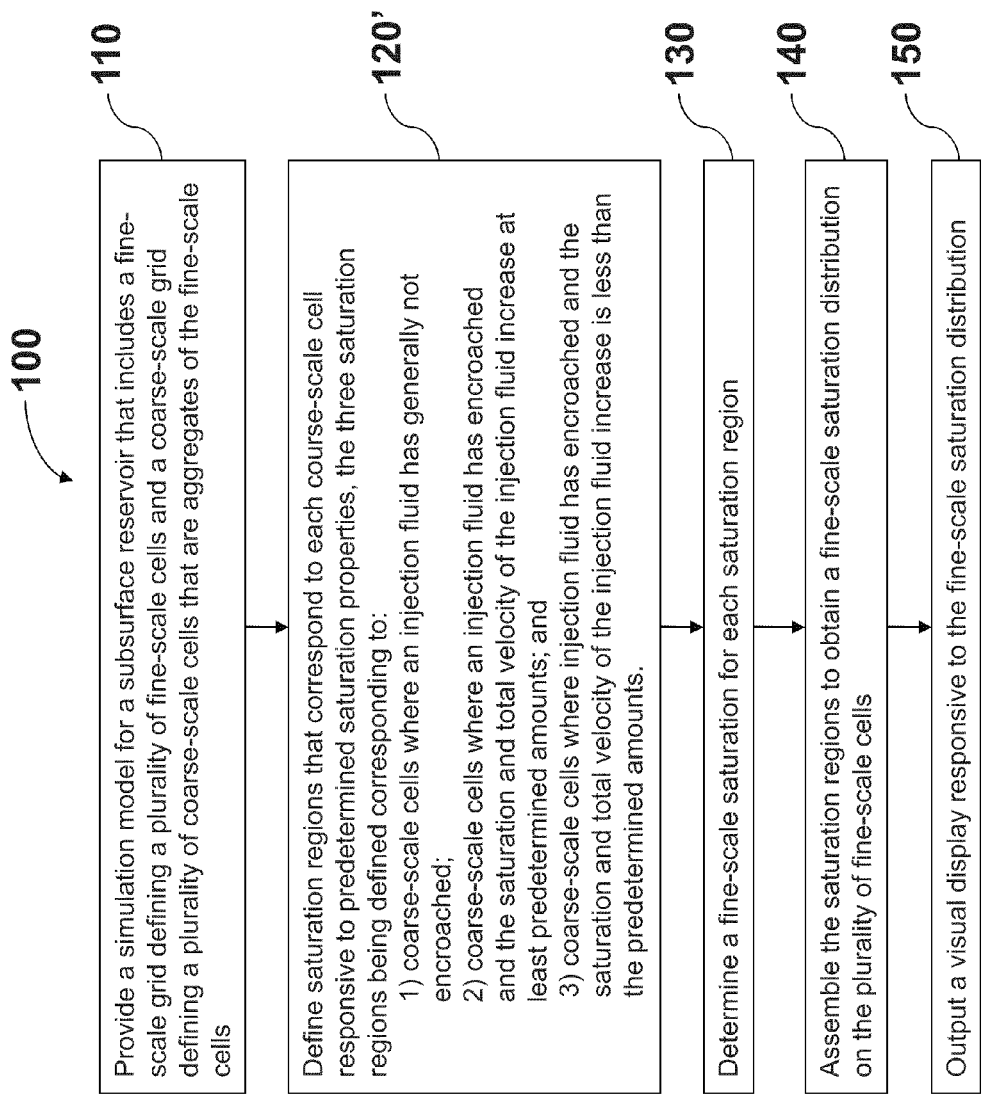
FIG. 5 is a flowchart showing the steps used in a reservoir simulator employing a multi-scale method where the coarse-scale cells are partitioned into three saturation regions, in accordance with the present invention.
Figure 6:
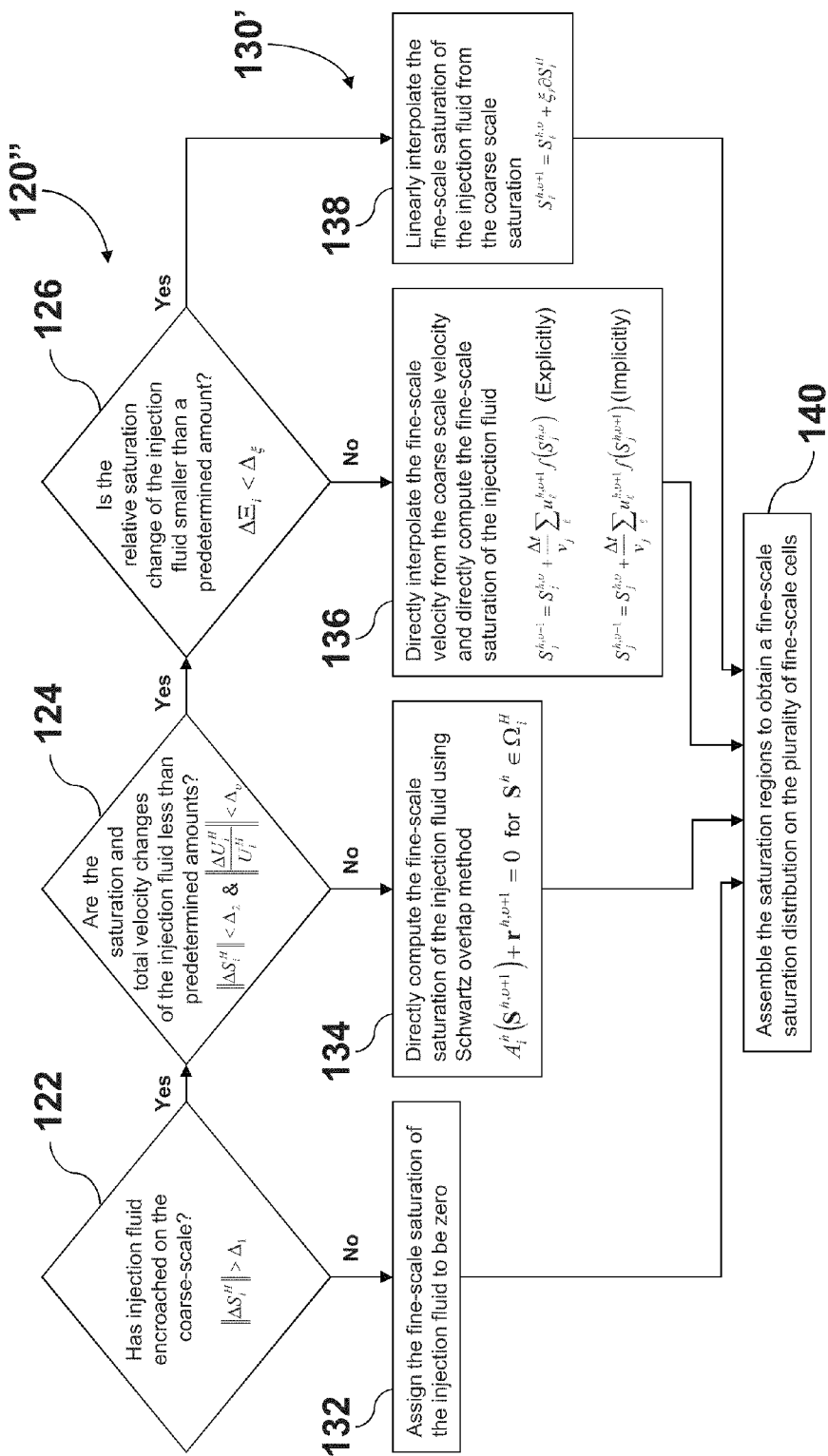
FIG. 6 is a flowchart detailing how fine-scale saturation is constructed for saturation regions, in accordance with the present invention.

FIGS. 4-6 illustratively condenses the above multi-scale algorithm into flow diagrams. Method (100) includes providing a simulation model for a subsurface reservoir that includes a fine-scale grid defining a plurality of fine-scale cells and a coarse-scale grid defining a plurality of coarse-scale cells that are aggregates of the fine-scale cells (Step 110). Saturation regions are defined that correspond to each coarse-scale cell responsive to predetermined saturation properties (Step 120). For example, the coarse-scale grid velocity and saturation changes can be used to identify saturation regions though use of Equation (50) and Equation (51). A fine-scale saturation is determined for each saturation region (Step 130). For example, the fine-scale saturation can be assigned a value of zero for some saturation regions or can be computed for some saturation regions, such as by calculation using Equations (40), (43), (45), and (46). The saturation regions are assembled to obtain a fine-scale saturation distribution on the plurality of fine-scale cells (Step 140).

Assembly of the saturation regions entails combining the fine-scale saturation in each course-scale cell on the course-scale grid. This process may iteratively continue until the fine-scale saturation field converges to a particular tolerance.

In some embodiments, and highlighted in FIG. 5, three types of saturation regions are defined for the coarse-scale cells responsive to predetermined saturation properties (Step 120'). A first region is defined where the injection fluid has not encroached the coarse-scale cells. A second region is defined where the injection fluid has encroached the coarse-scale cells and the saturation and total velocity of the injection fluid increases greater than or equal to predetermined amounts. A third region is defined where the injection fluid has encroached the coarse-scale cells and the saturation and total velocity of the injection fluid is less than the predetermined amounts. Additionally, a visual display can be output responsive to the fine-scale saturation distribution (Step 150). Examples of the visual display can include representations of simulated pressure distributions, saturation distributions, characteristics of saturation fronts, and cumulative oil recovery and oil fraction quantities.

FIG. 6 highlights one embodiment of the present invention where fine-scale saturations are determined (Step 130') for three identified saturation regions (Step 120"). To identify the three saturation regions, it is first determined whether the injection fluid has encroached on a coarse-scale (Step 122) such as by a predetermined amount $\|\Delta S_i^H\| > \Delta_1$. If the injection fluid has not encroached the saturation region, then the fine-scale saturation of the injection fluid is assigned to be zero (Step 132). If the injection fluid has encroached the saturation region, it is determined whether the saturation change and total velocity change of the injection fluid are less than predetermined amounts compared to the last time-step or iteration, mathematically this can be described as $$\|\Delta S_i^H\| < \Delta_2 \text{ and } \left\|\frac{\Delta U_i^H}{U_i^H}\right\| < \Delta_U \text{ (Step 124)}.$$

If the saturation change and/or total velocity change of the injection fluid are not less than predetermined amounts, the fine-scale saturation of the injection fluid is found via the Schwartz overlap method (Step 134) by using Neumann boundary conditions to derive fine-scale phase velocities that can then be applied to solve transport equations. This can be mathematically represented as $A_i^h(S^{h,v+1}) + r^{h,v+1} = 0$ for $S^h \in \Omega_i^H$. If the injection fluid has encroached the saturation region and the saturation change and total velocity change are less than the predetermined amounts, the fine-scale saturation of the injection fluid is interpolated using prolongation operators. It is first determined whether the relative saturation change of the injection fluid is less than a predetermined amount (i.e., $\Delta \Xi_i < \Delta_\Xi$) (Step 126). If the relative saturation change is more than the predetermined amount, the fine-scale velocities are interpolated from the coarse-scale velocities and then the fine-scale saturation may be directly computed (Step 136). Here, an explicit $$\left(S_j^{h,v+1} = S_j^{h,v} + \frac{\Delta t}{v_j} \sum_l u_l^{h,v+1} f(S_j^{h,v})\right)$$

or implicit $$\left(S_j^{h,v+1} = S_j^{h,v} + \frac{\Delta t}{v_j} \sum_l u_l^{h,v+1} f(S_j^{h,v+1})\right)$$

discretization scheme may be applied. If the relative saturation change is less than the predetermined amount, the fine-scale saturation is linearly interpolated directly from the coarse-scale saturation, which can be mathematically represented as $S_i^{h,v+1} = S_\Xi^{h,v} + \xi_i \partial S_i^H$ (Step 138). Once all the saturation regions have been constructed, the saturations are assembled to obtain a fine-scale saturation distribution on the plurality of fine-scale cells (Step 140). Again, this process may iteratively continue until the fine-scale saturation field converges to a particular tolerance. A visual display can be output responsive to the simulated fluid flow. For example, the visual display can include, but is not limited to, simulated pressure distributions, saturation distributions, characteristics of saturation fronts, and cumulative oil recovery and oil fraction quantities.

EXAMPLES

Reservoir models with various boundary conditions (source/sink or Dirichlet boundary conditions) were employed to extensively test the multi-scale method of the present invention for pressure and saturation calculations. Two-phase flow was studied in a homogeneous reservoir, a heterogeneous reservoir model with small isotropic permeability correlation length, and a highly heterogeneous media with a large anisotropic permeability correlation length. The first two examples include one injection and one production well at two diagonal corners of the model and the last example involves a linear displacement process with constant pressure conditions at inlet and outlet boundaries.

The fluids are assumed to be incompressible and the quadratic relative permeability model is employed ($k_{r_o} = S_v^2$ and $k_{r_w} = S_W^2$). The viscosity ratio between water and oil is 1:5 (unfavorable displacement). The nonlinear convergence tolerance for pressure ($\epsilon_p$) is set to be 1 psi and for saturation ($\epsilon_s$) is $10^{-4}$. In the adaptive transport algorithm, the transition criterion, $\Delta_1 = 10^{-5}$, is chosen for transitions from Region 1 (before the invasion of the injection fluid) to Region 2 (a sharp saturation change due to the initial encroachment of the injection fluid). The transition criteria, $\Delta_2 = 10^{-2}$ and $\Delta_v = 0.1$, are used from Region 2 to Region 3 (a slow saturation change after the saturation front moves through the region). Slightly different thresholds of relative saturation change ($\Delta_\Xi$) are used in different reservoir models. It has been found that a highly heterogeneous model requires a restrictive tolerance of $\Delta_\Xi$ in order to maintain numerical accuracy. In the examples provided herein, $\Delta_\Xi = 10^{-3}$ was employed for the first two examples and $\Delta_\Xi = 10^{-4}$ for the third example.

The fine-scale solution is the reference solution, and the $L_2$ norms of pressure and saturation errors are defined by $$e_p = \frac{\|p^{ms} - p^f\|_2}{\|p^{init}\|} \quad \text{(Equation 52)}$$

$$e_s = \|S^{ms} - S^f\|_2 \quad \text{(Equation 53)}$$

In the linear displacement process of Example 3, the pressure difference between the inlet and outlet edges may be employed as a characteristic pressure to normalize $e_p$.

Example 1

Homogeneous Media

Consider a 2-dimensional reservoir model of 700 ft×700 ft with homogeneous permeability k=100 md. Even though the model is 2-dimensional, an assumption that the model has a unit thickness of 1 ft in the third direction is made for convenience in the description of operating conditions. The fine-scale grid, 70×70, is uniformly coarsened into a 10×10 coarse-scale grid. The upscaling factor is 49 as each coarse-scale block comprises 7×7 fine-scale cells. The reservoir is originally saturated with oil and water is injected to displace the oil. Water is injected from the upper left corner and production occurs in the lower right corner. The initial reservoir pressure is 2000 psi. The injection rate of the water is constant at reservoir condition (50 bbl/day) and the reservoir fluid is produced at the same rate. The injection and production rates are evenly distributed in the coarse-scale grids (e.g., injection in the left upper coarse-scale grid and production in the right lower coarse-scale grid).

Figure 7C:
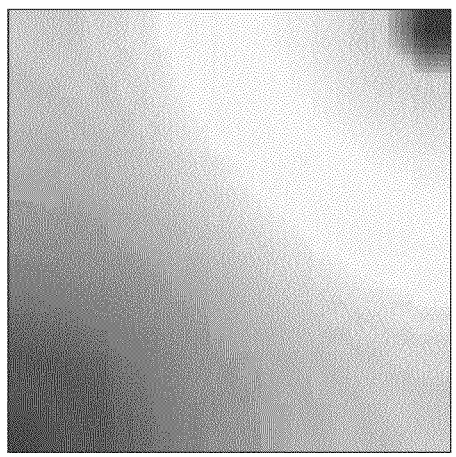
FIGS. 7A-C are illustrations showing a comparison of pressure distributions for a reference solution (7A), the original Multi-Scale Finite Volume without transport calculation adaptivity solution (7B), and a multi-scale approach using adaptive transport calculation solution (7C), in accordance with the present invention.
Figure 7B:
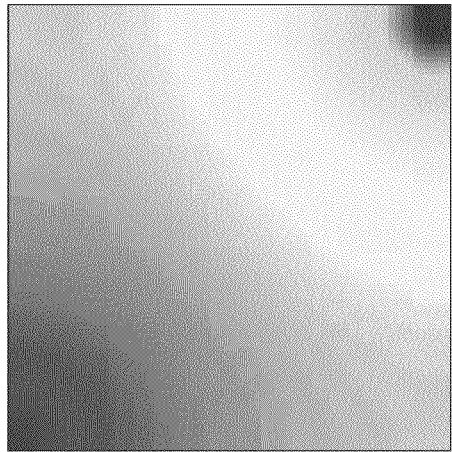
Figure 7A:
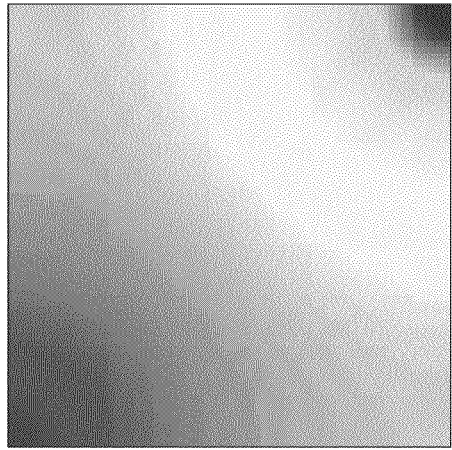
Figure 8C:
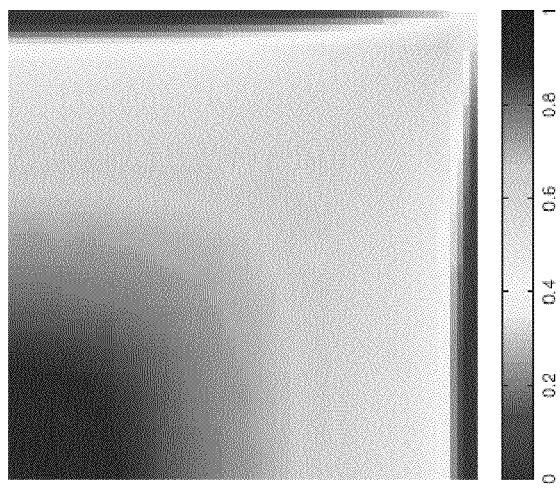
FIGS. 8A-C are illustrations showing a comparison of saturation distributions for a reference solution (8A), the original Multi-Scale Finite Volume without transport calculation adaptivity solution (8B), and a multi-scale approach using adaptive transport calculation solution (8C), in accordance with the present invention.
Figure 8B:
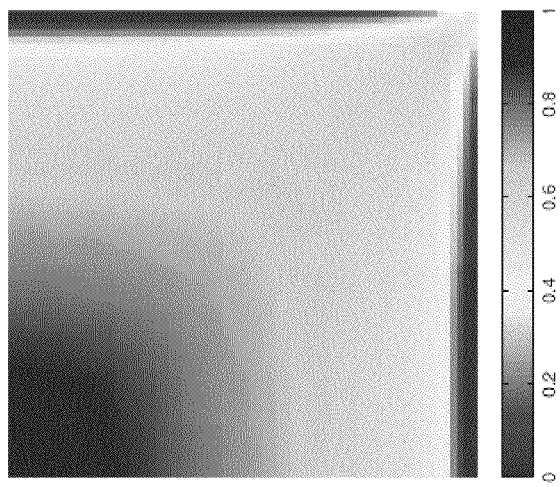
Figure 8A:
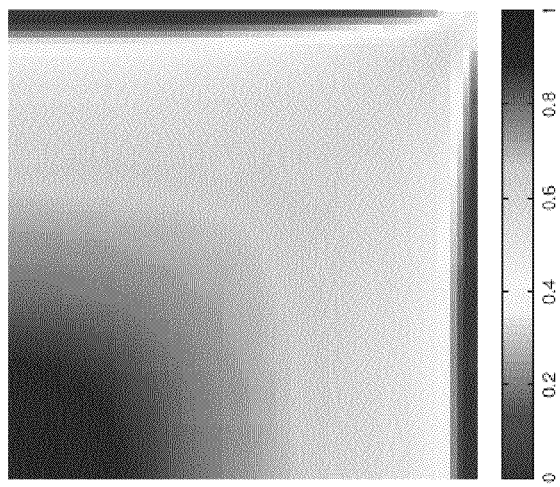

FIGS. 7 and 8 illustrate a comparison of pressure and saturation distributions at t=0.8 PVI (pore volume injected), respectively, for a reference solution (A), the original Multi-Scale Finite Volume without transport calculation adaptivity solution (B), and a multi-scale approach using adaptive transport calculation solution (C). In the Figures, the fine-scale method is denoted FM, the multi-scale Schwarz-Overlap method without adaptivity on transport computation is denoted MSOM, and the multi-scale approach using adaptive transport computation MSAT. The differences in pressure and saturation computed by the three methods in FIGS. 7 and 8 are almost indiscernible.

Figure 9C:
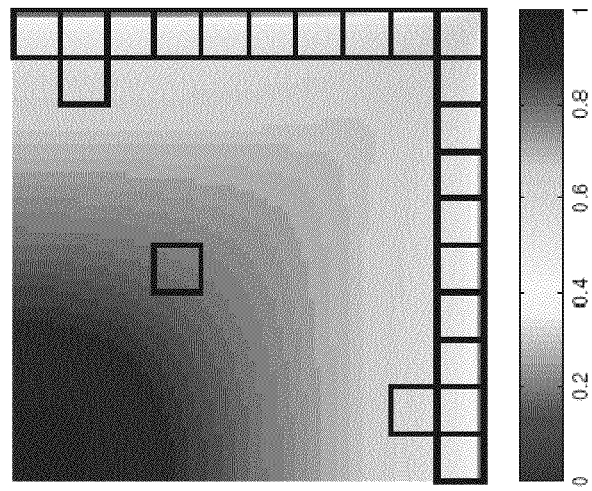
FIGS. 9A-C are illustrations showing the adaptive nature of adaptive transport calculation, in accordance with the present invention.
Figure 9B:
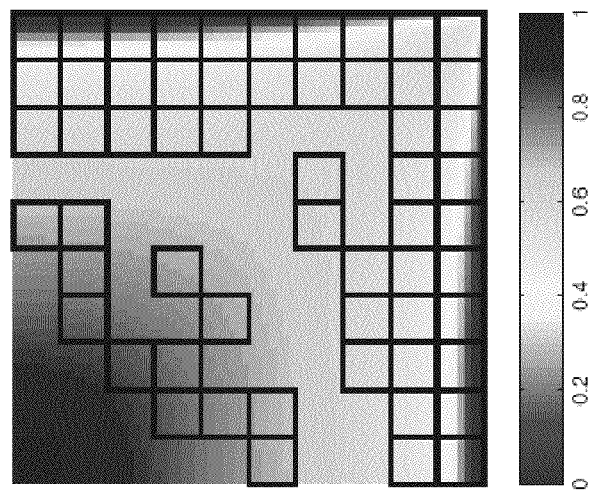
Figure 9A:
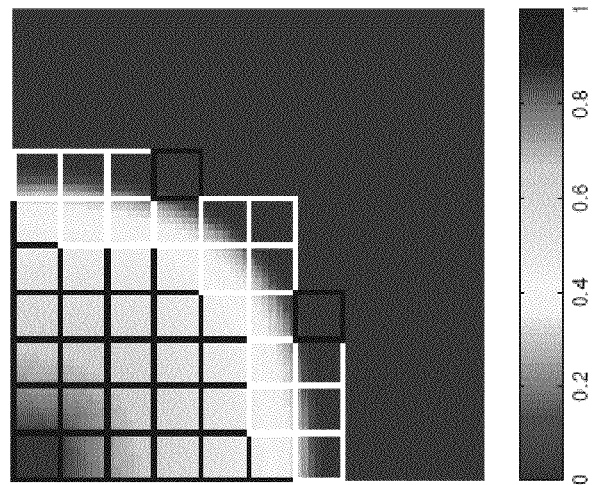

FIGS. 9A-C display the saturations, adaptively computed by MSAT, for three time steps. In FIG. 9, the white squares indicate Region 2 in which Prolongation Operator I (Schwartz-Overlap) is employed, at least once, in the iteration of pressure and saturation calculation at the time step. Since the transport equation is nonlinear for saturation, the algorithm requires multiple Newton iterations to solve it. Even in the same time step, the prolongation operator can be switched from I to II during iterations, if the saturation change becomes smaller than the transition criterion. The black squares in FIG. 9 indicate Region 3 where Prolongation Operator II was used at least once at the time step. Note that Prolongation Operator I was applied mainly in the region around the sharp saturation front. Furthermore, Prolongation Operator II was employed if saturation and total velocity changes were small. In later time, as the saturation distribution became well established in the most part of the model, Prolongation Operator III was widely employed in saturation calculation.

In Table 1 $L_2$ norms of MSOM and MSAT, with respect to the reference solution (FM), are tabulated for various time steps and the adaptivity ratio in pressure and saturation calculation is also included. The $e_p$ and $e_s$ are $L_2$ error norms for pressure and saturation respectively. The $f_p$ denotes the fraction of updated basis functions, $f_I$ the fraction of coarse-scale blocks that need fine-scale transport calculation by Prolongation Operator I, and $f_{II}$ the fraction of coarse-scale blocks that employ fine-scale transport calculation by Prolongation Operator II. All the statistics of adaptivity are measured by the average fraction computed from the first time step up to the current time step. For instance, the fraction of coarse-scale grids, in which Prolongation Operator I was applied in computing saturation from t=0 to t=0.8 PVI, was 6.01%.

Figure 10:
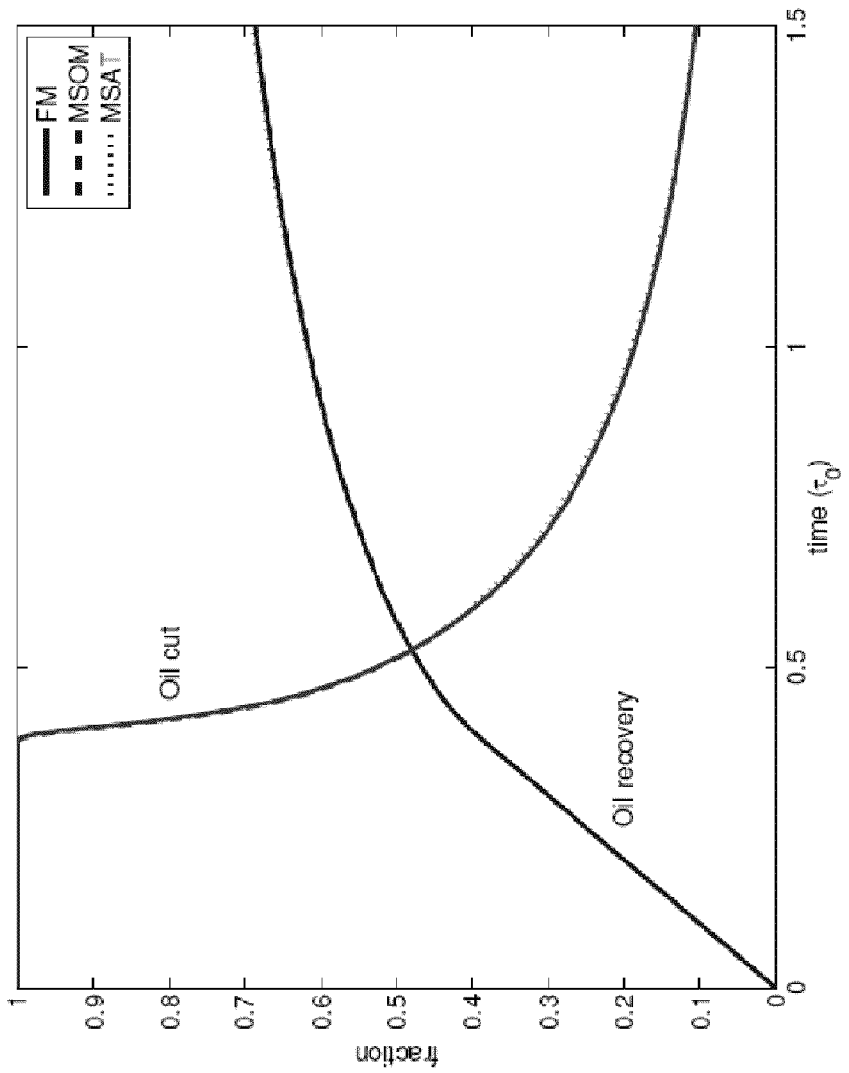
FIG. 10 is an illustration showing a comparison of the cumulative oil recovery and oil fraction in production, in accordance with the present invention.

FIG. 10 illustrates cumulative oil recovery and oil fraction in production curves for this example. Numerical errors in the cumulative oil recovery and the oil fraction are barely noticeable in FIG. 10.

From this numerical example, it is first noted that pressure from the adaptive transport calculation (MSAT) is as accurate as that from the original Multi-Scale Finite Volume without transport calculation adaptivity (MSOM). The (MSAT) method yields slightly higher numerical errors in saturation computation than MSOM, but it is still quite small. Secondly, the basis function updates for pressure calculation continuously decreases as the front moves along from the injection well to the production well. As the total mobility change is, in general, smaller than the saturation change, the pressure modification during the displacement process is rather moderate. As a result, a small percentage of basis functions is required to be updated (e.g., 1.95% in 1.5 PVI). Similarly, the total velocity also changes very slowly, which entails only 3.44% velocity updating during 1.5 PVI simulation. In comparison, the saturation front experiences a wide spread transitional region as it moves from the injection well to the production well. The fraction of the coarse-scale grid model that requires the original fine-scale transport calculation varies between 4.55% and 26.00%. One could increase the adaptivity by relaxing the transition criteria ($\Delta_1$ and $\Delta_2$), however, that may yield less accurate results.

Example 2

Heterogeneous Media with Log-Normal Permeability

Figure 11:
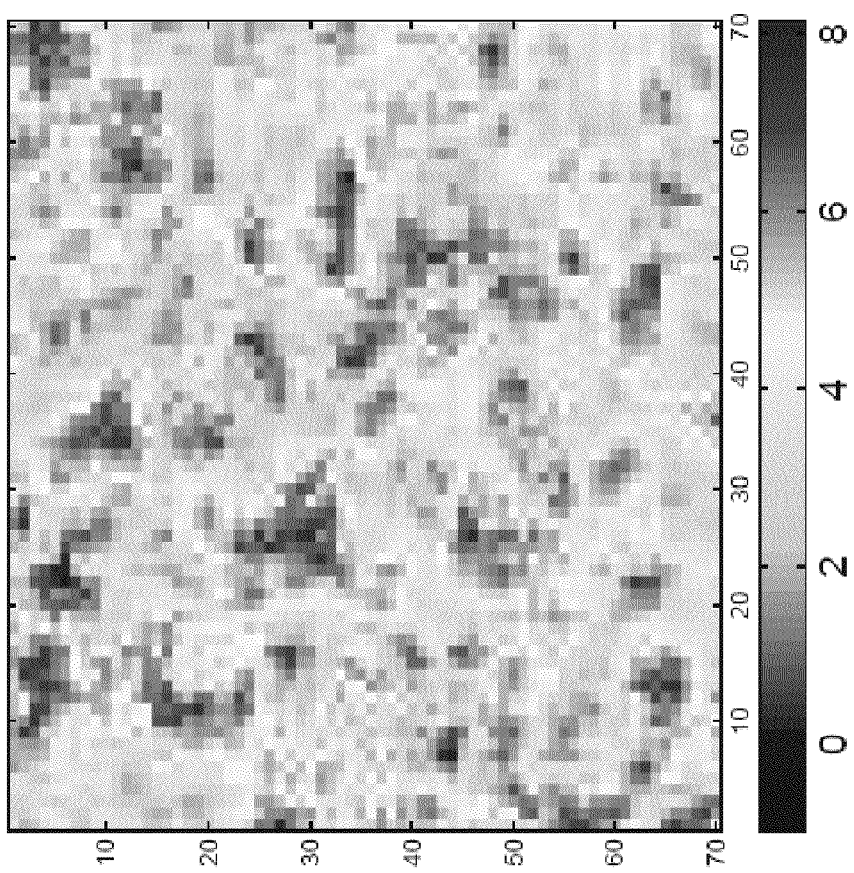
FIG. 11 is an illustration showing a log-normal permeability field, in accordance with the present invention.

FIG. 11 depicts the permeability field used in the second example. The reservoir model has a heterogeneous permeability field with moderate correlation lengths. The same reservoir model, as in the previous case, is employed except that the permeability field is distributed as log-normal with the mean value of logarithmic permeability 4 and variance 2

TABLE 1

| t (PVI) | $e_p$ | | $e_s$ | | $f_p$(%) | | $f_I$(%) | $f_{II}$(%) |
|---|---|---|---|---|---|---|---|---|
| | MSOM | MSAT | MSOM | MSAT | MSOM | MSAT | MSAT | MSAT |
| 0.2 | 2.09e−5 | 2.09e−5 | 5.05e−5 | 5.05e−5 | 3.31 | 3.88 | 10.67 | 4.55 |
| 0.6 | 1.77e−5 | 1.53e−5 | 4.33e−5 | 7.75e−5 | 2.89 | 2.85 | 7.56 | 21.42 |
| 0.8 | 1.47e−5 | 1.20e−5 | 3.85e−5 | 9.62e−5 | 2.50 | 2.24 | 6.01 | 26.00 |
| 1.0 | 1.31e−5 | 1.06e−5 | 3.37e−5 | 1.24e−4 | 2.17 | 2.16 | 4.85 | 25.38 |
| 1.2 | 1.20e−5 | 9.91e−6 | 3.05e−5 | 1.49e−4 | 2.05 | 2.06 | 4.15 | 24.15 |
| 1.5 | 1.10e−5 | 9.56e−6 | 2.71e−5 | 1.88e−4 | 1.95 | 1.95 | 3.44 | 22.13 | in milli-darcy and the spatial correlation length is given by 0.2. The permeability is generated by the Sequential Gaussian Simulation Method.

Figure 12A:
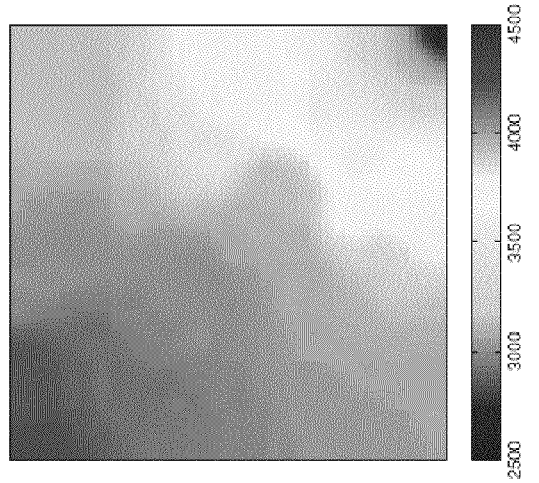
FIGS. 12A-C are illustrations showing a comparison of pressure distributions for a reference solution (12A), the original Multi-Scale Finite Volume without transport calculation adaptivity solution (12B), and a multi-scale approach using adaptive transport calculation solution (12C), in accordance with the present invention.
Figure 12B:
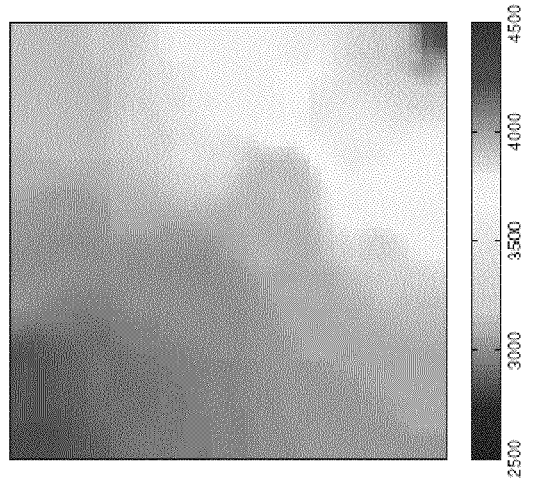
Figure 12C:
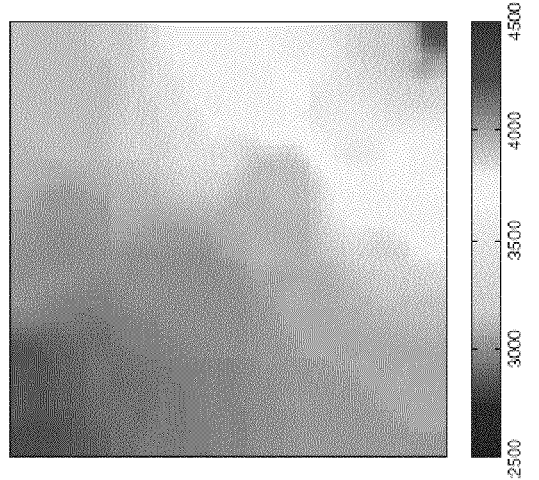
Figure 13A:
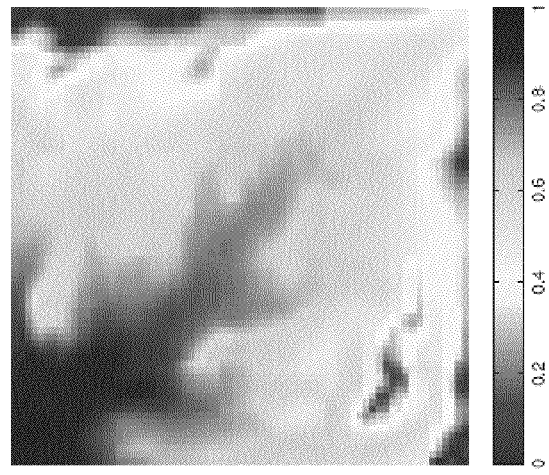
FIGS. 13A-C are illustrations showing a comparison of saturation distributions for a reference solution (13A), the original Multi-Scale Finite Volume without transport calculation adaptivity solution (13B), and a multi-scale approach using adaptive transport calculation solution (13C), in accordance with the present invention.
Figure 13B:
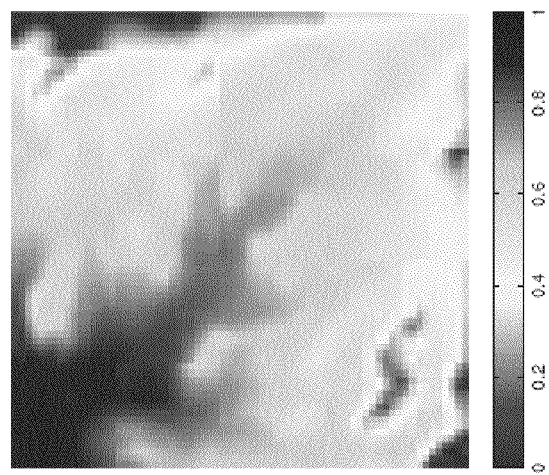
Figure 13C:
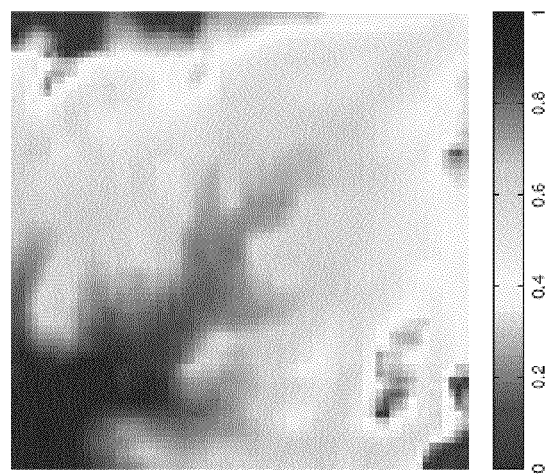

FIGS. 12 and 13 compare the pressure and saturation distribution at t=0.8 PVI for the three different methods, FM, MSOM and MSAT, respectively. In the presence of highly varying and correlated permeability field, the water saturation distribution exhibits a complex structure in FIG. 13, which contrasts with the simple, symmetric saturation distribution in FIG. 8 of the previous example. The accuracy of the numerical results from the multi-scale methods of MSOM and MSAT are high. The largest saturation errors are localized in the regions where permeability is very low.

Figure 14C:
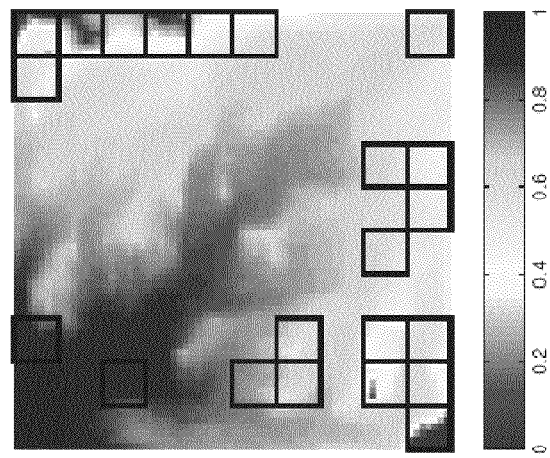
FIGS. 14A-C are illustrations showing the adaptive nature of adaptive transport calculation, in accordance with the present invention.
Figure 14B:
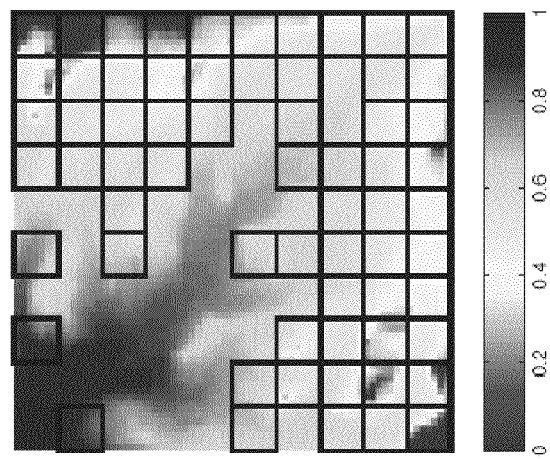
Figure 14A:
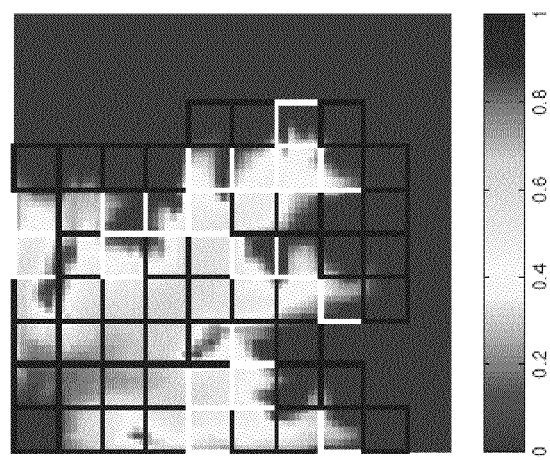

FIGS. 14A-C show the adaptivity of saturation computation is similar to that in homogeneous case. Prolongation Operator I is employed mainly around saturation front and Prolongation Operator II is then used until saturation distribution becomes established. The adaptive saturation calculation of the present invention (MSAT) yields numerical results as accurate as the original multi-scale method without transport adaptive calculation (MSOM). In Table 2 the $L_2$ norms of MSOM and MSAT, with respect to the reference solution (FM), are tabulated for various time steps and the adaptivity ratios in pressure and saturation calculation are also presented.

220×54 fine-scale grid and a 20×6 coarse-scale grid, which yields an upscaling factor of 11×9. The initial pressure is 4000 psi. The left boundary is kept at constant pressure 4000 psi with water injection and the right boundary is kept at constant pressure 1000 psi with reservoir fluid production. As the production and injection rates are continuously changing along time, a characteristic time may be represented by $$\tau_o = \frac{\phi L_x^2 \bar{\mu}}{\bar{k}|p^{left} - p^{right}|} \quad \text{(Equation 54)}$$

where $\bar{\mu}$ and $\bar{k}$ denote characteristic viscosity and permeability, respectively, and $L_x$ is the model dimension in the x-direction. The arithmetic average of water and oil viscosity are represented as $\bar{\mu}$ and the volume average of permeability as $\bar{k}$.

FIGS. 17A-C and 18A-C compare the pressure and saturation distributions at $t=4\tau_o$ for the reference solution (FM) and multi-scale methods (MSOM and MSAT), respectively. Even though the model contains a highly heterogeneous permeability field, the pressure fields in FIG. 17A-C exhibit almost one-dimensional profile along the flow direction due to the Dirichlet boundary conditions and a much larger geo-

TABLE 2

| t (PVI) | $e_p$ | | $e_s$ | | $f_p$(%) | | $f_I$(%) | $f_H$(%) |
|---|---|---|---|---|---|---|---|---|
| | MSOM | MSAT | MSOM | MSAT | MSOM | MSAT | MSAT | MSAT |
| 0.2 | 1.45e−4 | 1.41e−4 | 5.56e−4 | 5.57e−4 | 2.30 | 2.19 | 7.72 | 5.34 |
| 0.6 | 1.34e−4 | 1.39e−4 | 4.99e−4 | 5.69e−4 | 2.35 | 2.32 | 6.36 | 20.59 |
| 0.8 | 1.30e−4 | 1.38e−4 | 4.27e−4 | 5.66e−4 | 2.11 | 2.10 | 5.23 | 23.69 |
| 1.0 | 1.16e−4 | 1.22e−4 | 3.31e−4 | 4.77e−4 | 1.94 | 1.92 | 4.40 | 23.91 |
| 1.2 | 1.00e−4 | 1.04e−4 | 2.87e−4 | 4.65e−4 | 1.75 | 1.74 | 3.86 | 23.05 |
| 1.5 | 8.79e−5 | 9.01e−5 | 2.72e−5 | 4.70e−4 | 1.55 | 1.54 | 3.29 | 21.49 |

Figure 15:
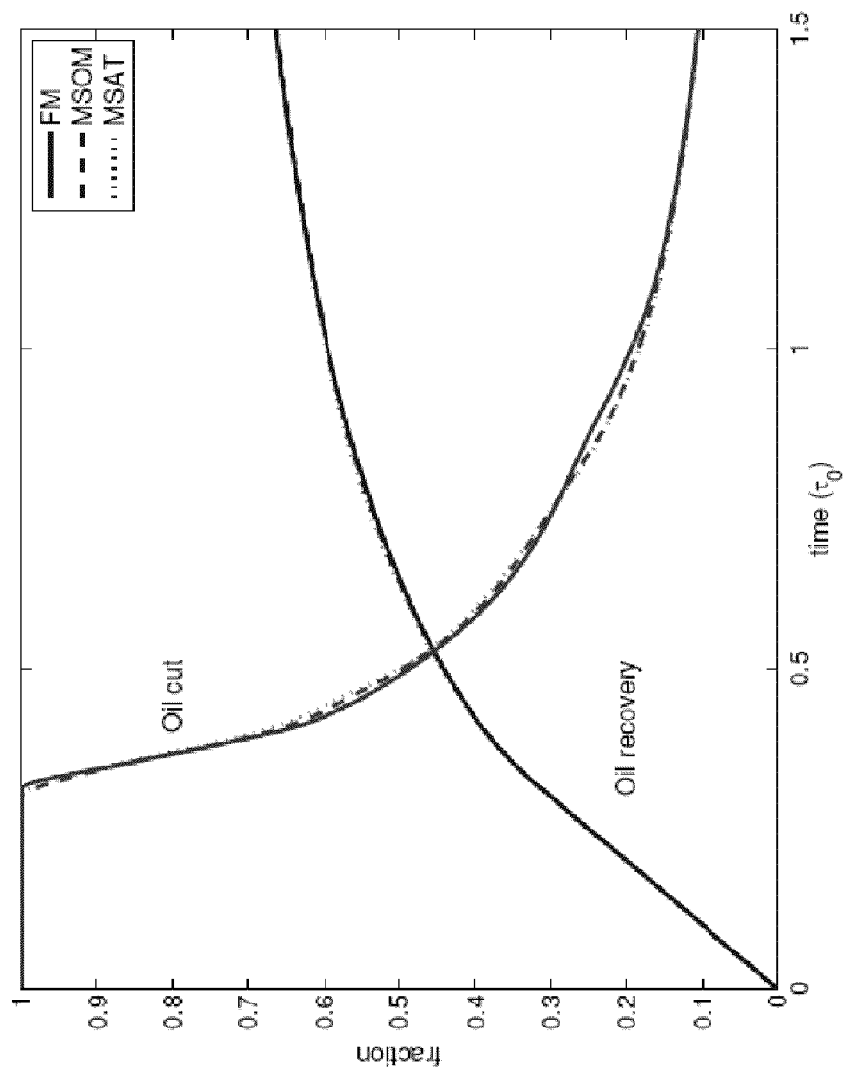
FIG. 15 is an illustration showing a comparison of the cumulative oil recovery and oil fraction in production, in accordance with the present invention.

FIG. 15 plots the cumulative oil recovery and the oil fraction in production. The production history in the multi-scale methods (MSOM and MSAT) are hardly distinguishable from that in the fine-scale reference method (FM). This numerical example with log-normal permeability clearly demonstrates that the adaptive transport algorithm is highly efficient and accurate in reproducing the original multi-scale results, as well as, the reference fine-grid simulation results.

Example 3

A Heterogeneous Model with Dirichlet Boundary Conditions

Figure 16:
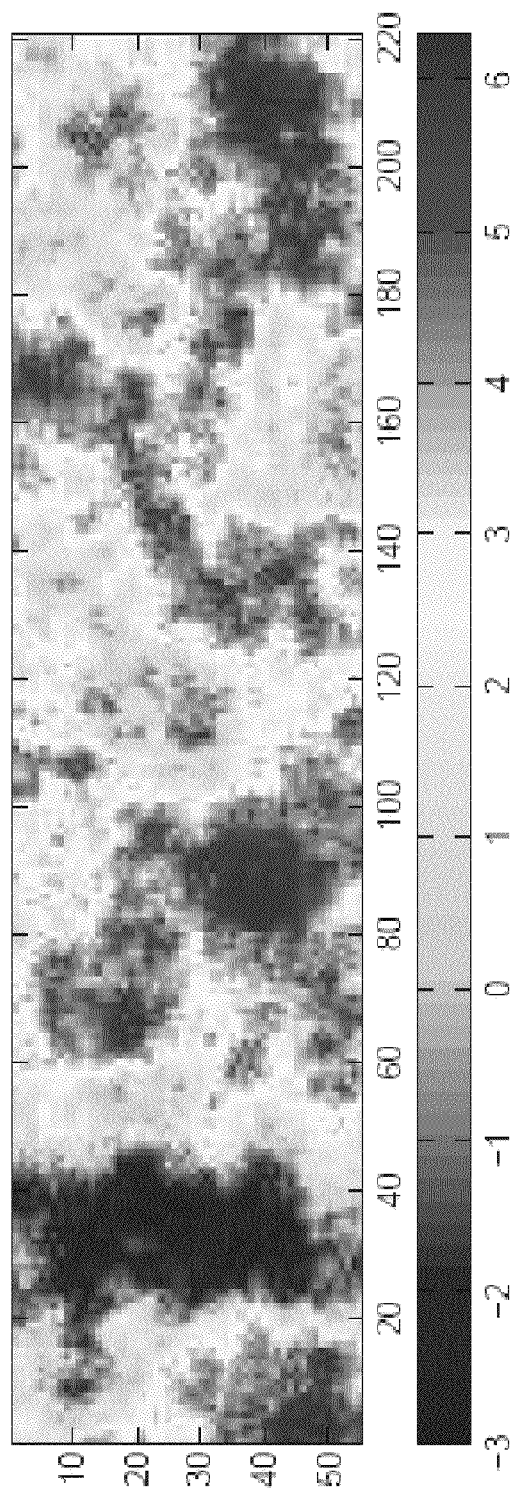
FIG. 16 is an illustration showing a permeability field, in accordance with the present invention.
Figure 17A:
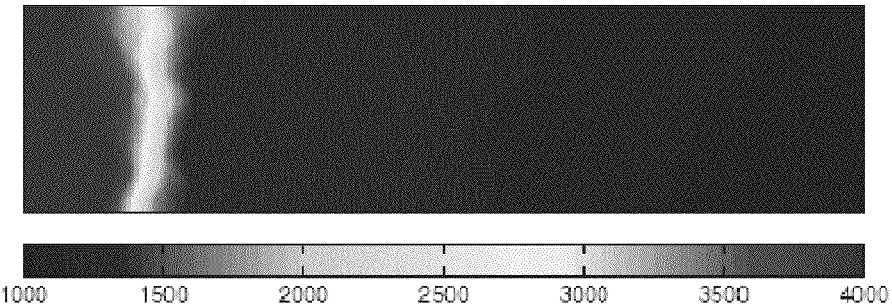
FIGS. 17A-C are illustrations showing a comparison of pressure distributions for a reference solution (17A), the original Multi-Scale Finite Volume without transport calculation adaptivity solution (17B), and a multi-scale approach using adaptive transport calculation solution (17C), in accordance with the present invention.
Figure 17B:
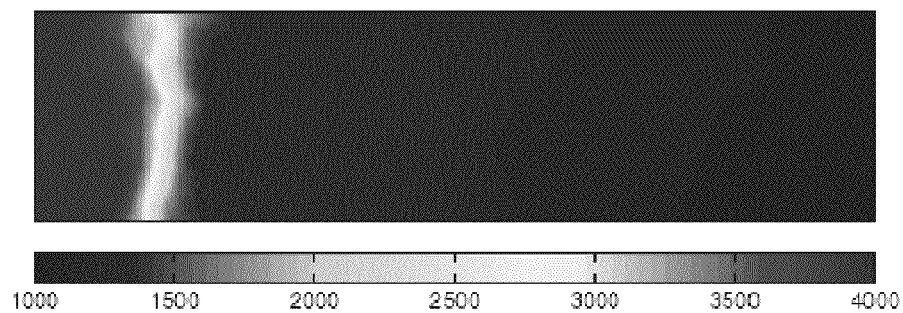
Figure 17C:
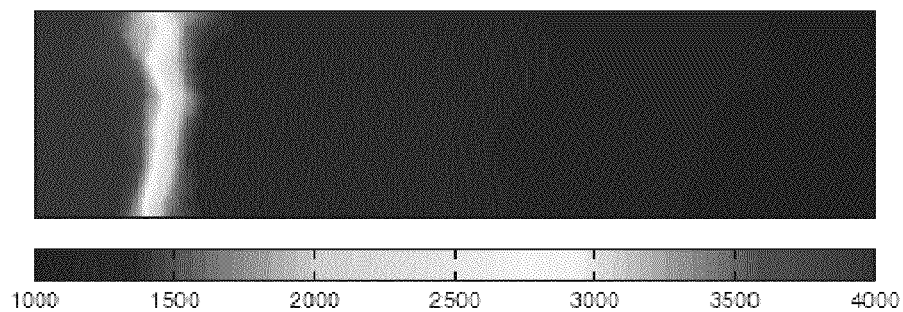
Figure 18A:
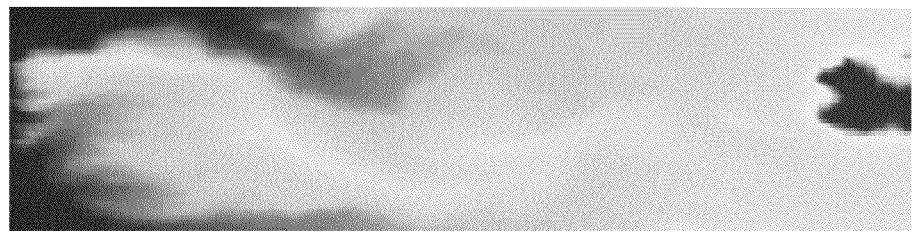
FIGS. 18A-C are illustrations showing a comparison of saturation distributions for a reference solution (18A), the original Multi-Scale Finite Volume without transport calculation adaptivity solution (18B), and a multi-scale approach using adaptive transport calculation solution (18C), in accordance with the present invention.
Figure 18B:
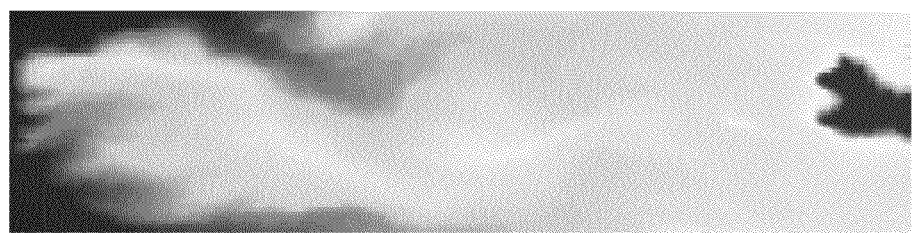
Figure 18C:
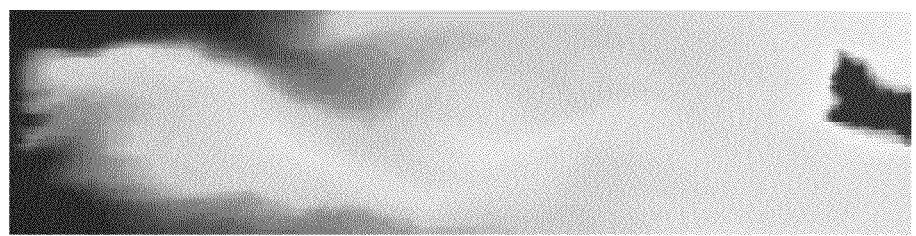

FIG. 16 shows the logarithmic permeability field in the third example. The permeability field is associated with a metrical dimension in the flow direction. On contrary, the saturation distribution clearly indicates the complex distribution of heterogeneity that results in a very complex, widespread saturation fronts, as illustrated in FIGS. 18A-C.

Figure 19A:
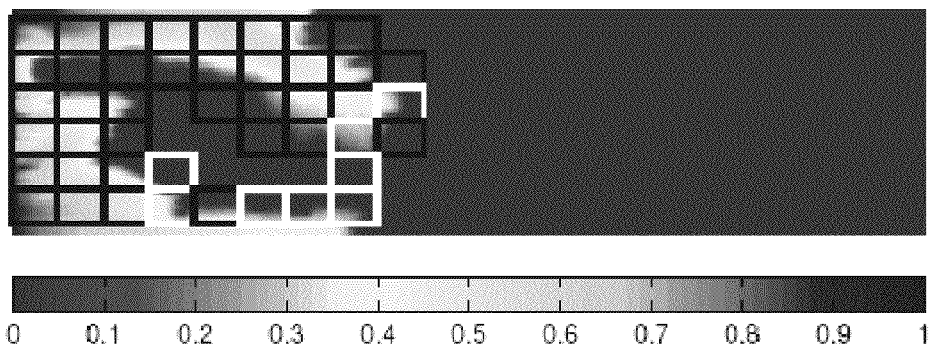
FIGS. 19A-C are illustrations showing the adaptive nature of adaptive transport calculation, in accordance with the present invention.
Figure 19B:
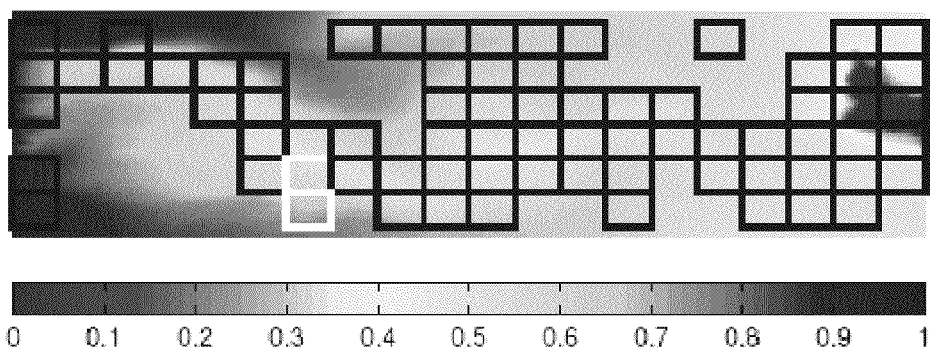
Figure 19C:
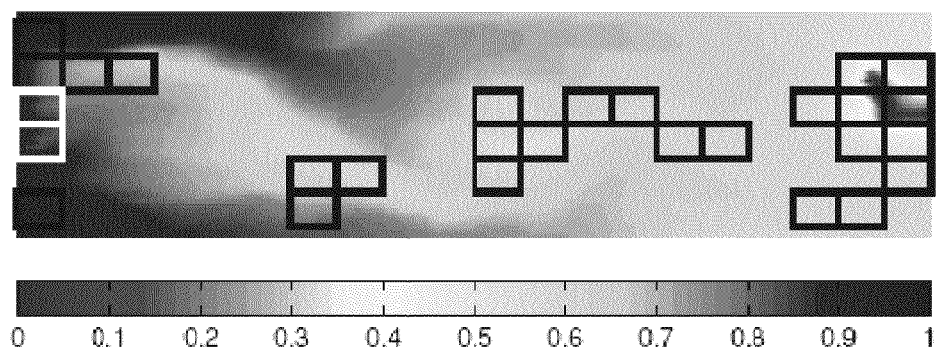

FIGS. 19A-C show adaptive saturation computations for three times steps in Example 3. Again, the white and black squares denote the region where Prolongation Operators I and II were applied respectively, at least once, in iterative saturation calculation at this time step. Prolongation Operator I was used in only a few regions either around the saturation fronts or where total velocity changes significantly. These statistics are more clearly manifested in Table 3. The fraction of Operator I application is less than 5% in all the listed time steps; and in later time, Operator III is mostly employed in the whole domain.

TABLE 3

| t (PVI) | $e_p$ | | $e_s$ | | $f_p$(%) | | $f_I$(%) | $f_H$(%) |
|---|---|---|---|---|---|---|---|---|
| | MSOM | MSAT | MSOM | MSAT | MSOM | MSAT | MSAT | MSAT |
| 1 | 6.76e−5 | 7.23e−5 | 2.94e−4 | 3.55e−4 | 3.78 | 3.76 | 4.20 | 7.35 |
| 2 | 6.37e−5 | 7.25e−5 | 3.78e−4 | 4.65e−4 | 4.41 | 4.49 | 4.28 | 15.77 |
| 3 | 6.68e−5 | 7.20e−5 | 2.88e−4 | 3.86e−4 | 4.65 | 4.79 | 3.82 | 24.85 |
| 4 | 6.55e−5 | 6.96e−5 | 2.16e−4 | 3.25e−4 | 4.55 | 4.61 | 3.40 | 30.22 |
| 5 | 6.49e−5 | 6.66e−5 | 1.80e−4 | 2.93e−4 | 4.24 | 4.25 | 2.96 | 31.47 |
| 6 | 6.49e−5 | 6.55e−5 | 1.59e−4 | 2.74e−4 | 3.87 | 3.89 | 2.58 | 29.98 |

Figure 20:
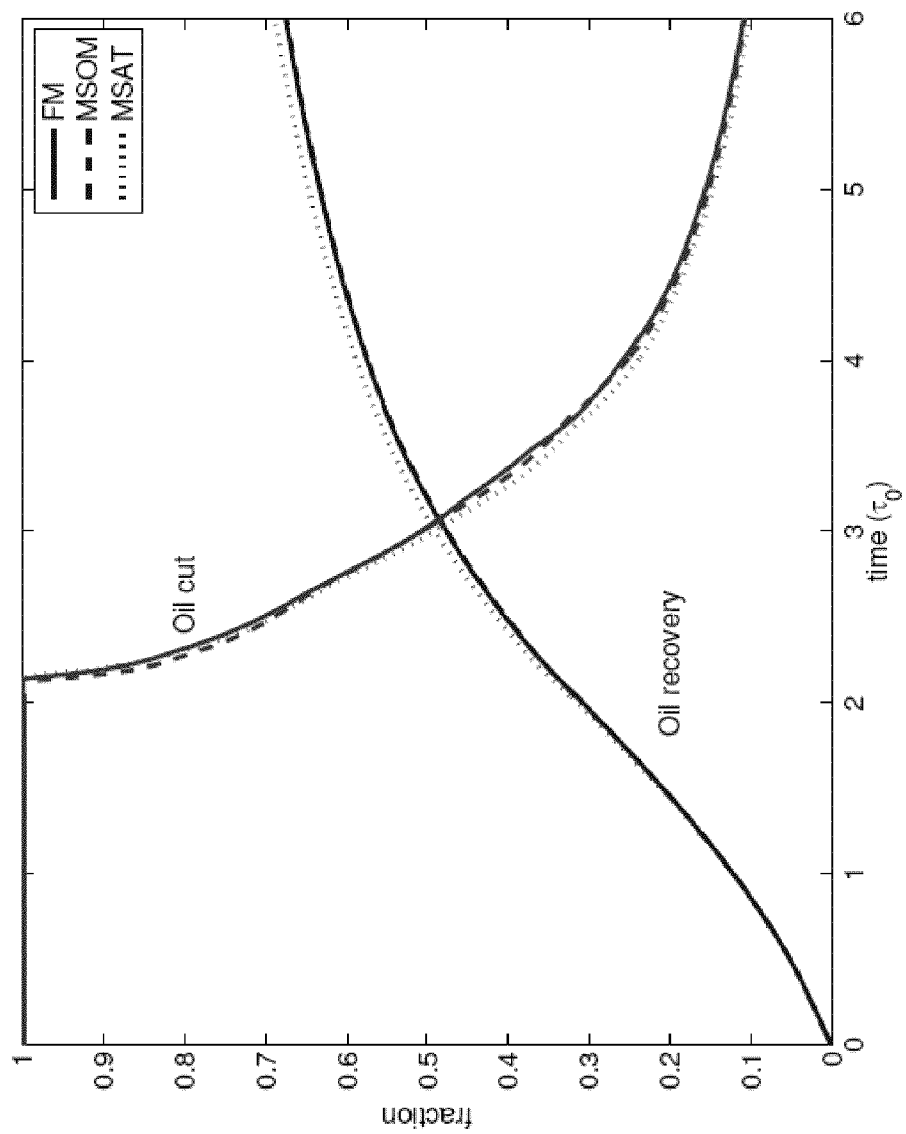
FIG. 20 is an illustration showing a comparison of the cumulative oil recovery and oil fraction, in accordance with the present invention.

FIG. 20 plots the cumulative oil recovery and the oil fraction in production. The fine-scale results and the multi-scale results are in excellent agreement, in spite of the high degree of heterogeneity and a large correlation length. The results of multi-scale adaptive transport computation and original multi-scale method are basically identical. Due to the high heterogeneity, a minor discrepancy between fine-scale and multi-scale results can be seen in this example, even though the errors in from multi-scale simulation are acceptable in engineering applications. In Table 3, $L_2$ norms of MSOM and MSAT, with respect to the reference solution (FM), are also tabulated for various time steps and the adaptivity statistics in the pressure and saturation calculation is also presented. Even in this highly heterogeneous problem, the adaptivity ratios of pressure and saturation are not much different from the previous examples. As the new saturation adaptivity requires Prolongation Operator I (expensive Schwartz-Overlap method) only for 2-5% of the domain, the method including transport adaptive calculation (MSAT) is significantly more efficient than the original Multi-Scale Finite Volume algorithm (MSOM).

These examples demonstrate that the multi-scale results of the present invention using an adaptive transport calculation are in excellent agreement with the fine-scale solutions. Furthermore, the adaptivity of flow and of the transport equations yields a much more computationally efficient algorithm over previous methods. It is contemplated within the scope of this invention to segment the coarse-scale grid into region quantities other than three, for instance 2 and 4 or greater (i.e., 4, 5, 6, etc.), to identify the transport regions in which a different, adaptive prolongation operator may be used to construct fine-scale saturation. However, as discussed above, three transport regions are found to be sufficient and are used in the examples. Similarly, it is contemplated within the scope of this invention to utilize non-uniform grid sizes, deviated grid orientations, altered grid cell shapes, and more than one dual coarse-scale grid. However, use of a uniform primal coarse-scale grid and dual coarse-scale grid are found to be sufficient.

While in the foregoing specification this invention has been described in relation to certain preferred embodiments thereof, and many details have been set forth for purpose of illustration, it will be apparent to those skilled in the art that the invention is susceptible to alteration and that certain other details described herein can vary considerably without departing from the basic principles of the invention.

What is claimed is:

1. A multi-scale method for use in simulating multi-phase fluid flow in a subsurface reservoir comprising:
    (a) providing a simulation model for a subsurface reservoir that includes a fine-scale grid defining a plurality of fine-scale cells and a coarse-scale grid defining a plurality of coarse-scale cells that are aggregates of the fine-scale cells;
    (b) determining a coarse-scale pressure for each coarse-scale cell;
    (c) determining a coarse-scale velocity and a coarse-scale saturation for each coarse-scale cell responsive to the coarse-scale pressure;
    (d) defining saturation regions that correspond to each coarse-scale cell, the saturation regions being defined responsive to predetermined saturation properties that are associated with the coarse-scale velocity and the coarse-scale saturation for each coarse-scale cell;
    (e) determining a fine-scale saturation value for each saturation region;
    (f) assembling the saturation regions with each respective fine-scale saturation value to obtain a fine-scale saturation distribution; and
    (g) outputting a visual display responsive to the fine-scale saturation distribution.

2. The method of claim 1, wherein the predetermined saturation properties include the coarse-scale saturation of an injection fluid being less than a predetermined amount.

3. The method of claim 1, wherein the predetermined saturation properties include having a change in the coarse-scale saturation being less than a predetermined amount.

4. The method of claim 1, wherein the predetermined saturation properties include having a change in the coarse-scale velocity being less than a predetermined amount.

5. The method of claim 1, wherein the saturation regions defined in step (d) include a saturation region where the predetermined saturation properties include having the coarse-scale saturation of an injection fluid being less than a predetermined amount.

6. The method of claim 5, wherein determining the fine-scale saturation for the saturation region where the predetermined saturation properties include having the coarse-scale saturation of the injection fluid being less than the predetermined amount consists of assigning the fine-scale saturation value a value of zero.

7. The method of claim 1, wherein the saturation regions defined in step (d) include a saturation region where the predetermined saturation properties include having the coarse-scale saturation of an injection fluid of at least a first predetermined amount, having a change in the coarse-scale saturation by at least a second predetermined amount, and having a change in the coarse-scale velocity by at least a third predetermined amount.

8. The method of claim 7, wherein determining the fine-scale saturation for the saturation region where the predetermined saturation properties having the coarse-scale saturation of the injection fluid of at least the first predetermined amount, having the change in the coarse-scale saturation by at least the second predetermined amount, and having the change in the coarse-scale velocity by at least the third predetermined amount comprises computing the fine-scale saturation responsive to a conservative fine-scale velocity field using a Schwarz-Overlap method.

9. The method of claim 1, wherein the saturation regions defined in step (d) include a saturation region where the predetermined saturation properties include having the coarse-scale saturation of an injection fluid of at least a first predetermined amount, having a change in the coarse-scale saturation by at least a second predetermined amount, and having a change in the coarse-scale velocity by less than a third predetermined amount.

10. The method of claim 9, wherein determining the fine-scale saturation for the saturation region where the predetermined saturation properties include having the coarse-scale saturation of the injection fluid of at least the first predetermined amount, having the change in the coarse-scale saturation by less than the second predetermined amount, and having the change in the coarse-scale velocity by less than the third predetermined amount comprises using a prolongation operator that is selected responsive to a relative saturation change of the injection fluid in the fine-scale cells.

11. The method of claim 10, wherein the prolongation operator interpolates a fine-scale velocity field from the coarse-scale velocity and computes the fine-scale saturation responsive to the fine-scale velocity field.

12. The method of claim 10, wherein the prolongation operator interpolates the fine-scale saturation from the coarse-scale saturation.

13. A multi-scale method for use in simulating multi-phase fluid flow in a subsurface reservoir comprising:
(a) providing a simulation model for a subsurface reservoir that includes a fine-scale grid defining a plurality of fine-scale cells and a coarse-scale grid defining a plurality of coarse-scale cells that are aggregates of the fine-scale cells;
(b) performing at least one of the following steps selected from the group consisting of:
  (i) assigning coarse-scale cells a fine-scale saturation value of zero when the coarse-scale cells have been saturated by an injection fluid less than a predetermined amount; and
  (ii) determining a fine-scale saturation within each coarse-scale cell using a prolongation operator when the coarse-scale cells have been saturated by an injection fluid of at least a predetermined amount;
(c) assembling the results from step (b) to obtain a fine-scale saturation distribution associated with the coarse-scale cells; and
(d) outputting a visual display responsive to the fine-scale saturation distribution.

14. The method of claim 13, wherein the prolongation operator in step (b)(ii) performs one of the following steps for each coarse-scale cell selected from the group consisting of:
(a) computation of the fine-scale saturation responsive to a conservative fine-scale velocity field using a Schwarz-Overlap method;
(b) interpolation of a fine-scale velocity field from a coarse-scale velocity and computation of the fine-scale saturation responsive to the interpolated fine-scale velocity field; and
(c) interpolation of the fine-scale saturation from a coarse-scale saturation.

15. The method of claim 13, wherein the prolongation operator in step (b)(ii) is determined for each coarse-scale cell by total velocity changes and saturation changes of the injection fluid in the coarse-scale cell.

16. The method of claim 15, wherein the prolongation operator is further determined by relative saturation changes of the injection fluid in the fine-scale cells.

17. A multi-scale method for use in simulating multi-phase fluid flow in a subsurface reservoir comprising:
(a) providing a simulation model for a subsurface reservoir that includes a fine-scale grid defining a plurality of fine-scale cells and a coarse-scale grid defining a plurality of coarse-scale cells that are aggregates of the fine-scale cells;
(b) determining a fine-scale saturation within each coarse-scale cell by performing one of the following steps selected from the group consisting of:
  (i) assigning the fine-scale saturation a value of zero when the coarse-scale cell has been saturated by an injection fluid less than a first predetermined amount;
  (ii) computing the fine-scale saturation responsive to a conservative fine-scale velocity field by using a Schwarz-Overlap method when the coarse-scale cell has been saturated by the injection fluid by at least the first predetermined amount, a saturation change in the coarse-scale cell is at least a second predetermined amount, and a total velocity change of the injection fluid in the coarse-scale cell is at least a third predetermined amount; and
  (iii) interpolating the fine-scale saturation using a prolongation operator when the coarse-scale cell has been saturated by the injection fluid by at least the first predetermined amount, the saturation change in the coarse-scale cell is less than the second predetermined amount, and the total velocity change of the injection fluid in the coarse-scale cell is less than the third predetermined amount;
(c) assembling the fine-scale saturations associated with each coarse-scale cell to obtain a fine-scale saturation distribution for the subsurface reservoir;
(d) repeating steps (b) and (c) over a series of time steps to simulate fluid flow in the subsurface reservoir; and
(e) outputting a visual display responsive to the simulated fluid flow in step (d).

18. The method of claim 17, wherein the prolongation operator in step (b)(iii) is selected responsive to a relative saturation change of the injection fluid in the fine-scale cells.

19. The method of claim 17, wherein the interpolating the fine-scale saturation using a prolongation operator in step (b)(iii) comprises interpolating a fine-scale velocity field from a coarse-scale velocity field and computing the fine-scale saturation responsive to the fine-scale velocity field.

20. The method of claim 17, wherein the interpolating the fine-scale saturation using a prolongation operator in step (b)(iii) comprises interpolating the fine-scale saturation of each fine-scale cell contained in a coarse cell directly from a respective coarse-scale saturation.

21. The method of claim 1, wherein computations for at least one of a fine-scale pressure, a fine-scale velocity, and each fine-scale saturation value for any value of time are performed using governing conservation equations with a multi-scale finite-volume method.

22. The method of claim 1, wherein the simulation model is associated with heterogeneous reservoir properties including permeability and porosity and comprises one of the following selected from the group consisting of a one-dimensional simulation model, a two-dimensional simulation model, and a three-dimensional simulation model.

23. The method of claim 1, wherein the fine-scale saturation distribution is computed adaptively.

24. The method of claim 1, wherein each fine-scale saturation value is computed sequentially responsive to a fine-scale pressure and a fine-scale velocity.

25. The method of claim 24, wherein the fine-scale pressure and the fine-scale velocity are computed implicitly and each fine-scale saturation value is computed explicitly.

26. The method of claim 24, wherein the fine-scale pressure, the fine-scale velocity, and each fine-scale saturation value are computed implicitly.

* * * * *